United States Patent
Duan et al.

(10) Patent No.: US 12,439,275 B2
(45) Date of Patent: Oct. 7, 2025

(54) BEAM ADAPTATION FOR RECONFIGURABLE INTELLIGENT SURFACE AIDED UE POSITIONING

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 17/813,456

(22) Filed: Jul. 19, 2022

(65) Prior Publication Data

US 2024/0031823 A1    Jan. 25, 2024

(51) Int. Cl.
*H04W 16/28*  (2009.01)
*H04B 17/318* (2015.01)
*H04W 24/10*  (2009.01)

(52) U.S. Cl.
CPC .......... *H04W 16/28* (2013.01); *H04B 17/318* (2015.01); *H04W 24/10* (2013.01)

(58) Field of Classification Search
CPC ... H04W 16/28; H04W 24/10; H04W 84/047; H04W 16/26; H04B 17/318; H04B 7/06952; H04B 7/088; H04B 7/04013; H04L 5/0048; G01S 5/0009; G01S 5/0205; G01S 5/0273; G01S 7/006; G01S 13/765
USPC ....................................................... 370/329
See application file for complete search history.

(56) References Cited

U.S. PATENT DOCUMENTS

| | | | | |
|---|---|---|---|---|
| 2022/0094417 A1* | 3/2022 | Ashari | ................ | H04B 7/088 |
| 2022/0407222 A1* | 12/2022 | Zhu | ................ | H04W 24/10 |
| 2023/0258759 A1* | 8/2023 | Wang | ................ | G01S 1/08 |
| | | | | 455/456.1 |

(Continued)

FOREIGN PATENT DOCUMENTS

| | | |
|---|---|---|
| CN | 112468193 A | 3/2021 |
| CN | 113133014 A | 7/2021 |

(Continued)

OTHER PUBLICATIONS

International Search Report and Written Opinion—PCT/US2023/023428—ISA/EPO—Oct. 25, 2023.

(Continued)

*Primary Examiner* — Kwang B Yao
*Assistant Examiner* — Syed M Bokhari
(74) *Attorney, Agent, or Firm* — Procopio, Cory, Hargreaves & Savitch LLP/ QUALCOMM Incorporated

(57) ABSTRACT

Aspects presented herein may improve the performance and accuracy of a UE positioning based on RIS, such as when the RIS has a limited number of control voltage sets available. In one aspect, a UE obtains an indication of beam pattern information for a set of DL beams for a network entity, where the set of DL beams is associated with an RIS. The UE adjusts a first transmission angle for a set of UL beams based on the beam pattern information and measurement for the set of DL beams, where the first transmission angle for the set of UL beams is adjusted to proximately align with a second transmission angle of the set of DL beams from the RIS. The UE transmits, via the RIS, the set of UL beams to the network entity based on the adjusted first transmission angle.

23 Claims, 19 Drawing Sheets

(56) References Cited

U.S. PATENT DOCUMENTS

| | | | | |
|---|---|---|---|---|
| 2023/0327714 A1* | 10/2023 | Baligh | ............... | H04B 7/088 |
| | | | | 375/262 |
| 2023/0421224 A1* | 12/2023 | Lee | ............... | H04B 7/0626 |
| 2024/0072849 A1* | 2/2024 | Haija | ............... | H04B 7/06952 |
| 2024/0405807 A1* | 12/2024 | Haija | ............... | H04B 7/04013 |

FOREIGN PATENT DOCUMENTS

| | | | |
|---|---|---|---|
| EP | 3562236 | A1 | 10/2019 |
| WO | 2021240619 | A1 | 12/2021 |
| WO | 2022124733 | A1 | 6/2022 |
| WO | 2022133952 | A1 | 6/2022 |
| WO | 2022133957 | A1 | 6/2022 |
| WO | 2022133958 | A1 | 6/2022 |

OTHER PUBLICATIONS

Partial International Search Report—PCT/US2023/023428—ISA/EPO—Aug. 1, 2023.

* cited by examiner

BEAM ADAPTATION FOR RECONFIGURABLE INTELLIGENT SURFACE AIDED UE POSITIONING

TECHNICAL FIELD

The present disclosure relates generally to positioning systems, and more particularly, to positioning systems involving reconfigurable intelligent surface (RIS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains an indication of beam pattern information for a set of downlink (DL) beams for a network entity, where the set of DL beams is associated with a reconfigurable intelligent surface (RIS). The apparatus adjusts a first transmission angle for a set of uplink (UL) beams based on the beam pattern information and measurement for the set of DL beams, where the first transmission angle for the set of UL beams is adjusted to proximately align with a second transmission angle of the set of DL beams from the RIS. The apparatus transmits, via the RIS, the set of UL beams to the network entity based on the adjusted first transmission angle.

In an aspect of the disclosure, a method, a computer-readable medium, and an apparatus are provided. The apparatus transmits an indication of beam pattern information for a set of DL beams to a UE, where the set of DL beams is associated with an RIS. The apparatus receives a set of UL beams from the UE based on an adjusted transmission angle derived from the beam pattern information and measurement for the set of DL beams, where the set of UL beams is received from the UE via the RIS.

In an aspect of the disclosure, a method, a computer-readable medium, and an apparatus are provided. The apparatus receives, from a UE, a plurality of SRS transmissions via at least one UE UL beam. The apparatus forwards the plurality of SRS transmissions to a network entity via a set of RIS UL beams, where each RIS UL beam in the set of RIS UL beams is associated with one UL control voltage in a set of UL control voltages, and where each UL control voltage in the set of UL control voltages is associated with a reflection angle for the at least one UE UL beam. The apparatus receives, from the network entity, an indication indicating a RIS UL beam from the set of RIS UL beams, where the RIS UL beam is selected from the set of RIS UL beams based on one or more measurements associated with the plurality of SRS transmissions. The apparatus forwards subsequent communication between the UE and the network entity based on a control voltage pair that includes a DL control voltage and a UL control voltage from the set of UL control voltages that corresponds to the RIS UL beam indicated by the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
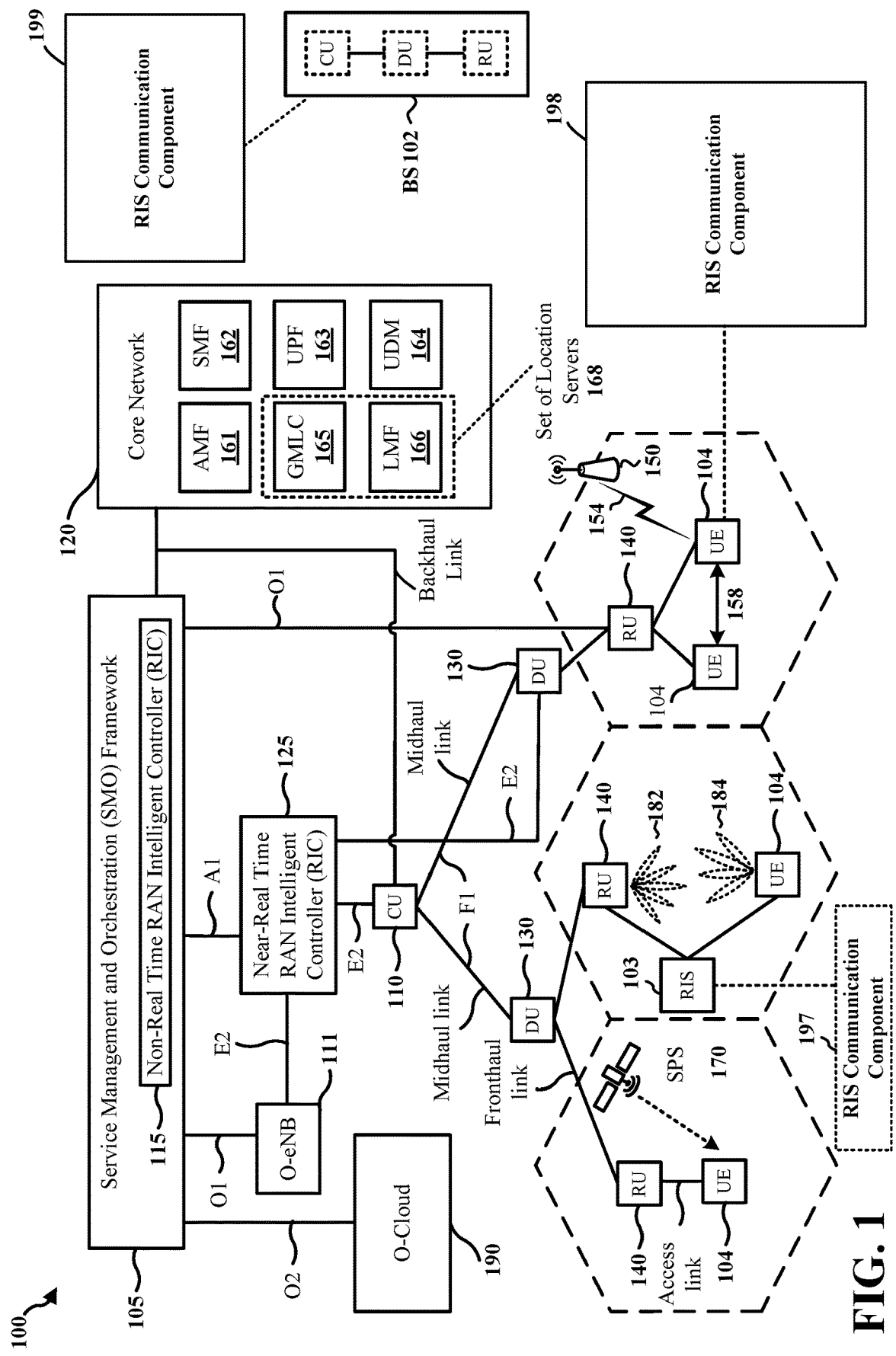
FIG. 1 is a diagram illustrating an example of a wireless communications system and an access network.

Aspects presented herein may improve the performance and accuracy of a UE positioning based on RIS, such as when the RIS has a limited number of control voltage sets available. Aspects presented here may also improve the beam correspondence between a base station and a UE when the base station and the UE are communicating with each other via an RIS.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to obtain an indication of beam pattern information for a set of DL beams for a network entity, where the set of DL beams is associated with an RIS; adjust a first transmission angle for a set of UL beams based on the beam pattern information and measurement for the set of DL beams, where the first transmission angle for the set of UL beams is adjusted to proximately align with a second transmission angle of the set of DL beams from the RIS; and transmit, via the RIS, the set of UL beams to the network entity based on the adjusted first transmission angle (e.g., via the RIS communication component 198). In certain aspects, the base station 102 may be configured to transmit an indication of beam pattern information for a set of DL beams to a UE, where the set of DL beams is associated with an RIS; and receive a set of UL beams from the UE based on an adjusted transmission angle derived from the beam pattern information and measurement for the set of DL beams, where the set of UL beams is received from the UE via the RIS (e.g., via the RIS communication component 199). In certain aspects, the RIS 103 may be configured to receive, from a UE, a plurality of SRS transmissions via at least one UE UL beam; forward the plurality of SRS transmissions to a network entity via a set of RIS UL beams, where each RIS UL beam in the set of RIS UL beams is associated with one UL control voltage in a set of UL control voltages, and where each UL control voltage in the set of UL control voltages is associated with a reflection angle for the at least one UE UL beam; receive, from the network entity, an indication indicating a RIS UL beam from the set of RIS UL beams, where the RIS UL beam is selected from the set of RIS UL beams based on one or more measurements associated with the plurality of SRS transmissions; and forward subsequent communication between the UE and the network entity based on a control voltage pair that includes a DL control voltage and a UL control voltage from the set of UL control voltages that corresponds to the RIS UL beam indicated by the network entity (e.g., via the RIS communication component 197).

Figure 2:
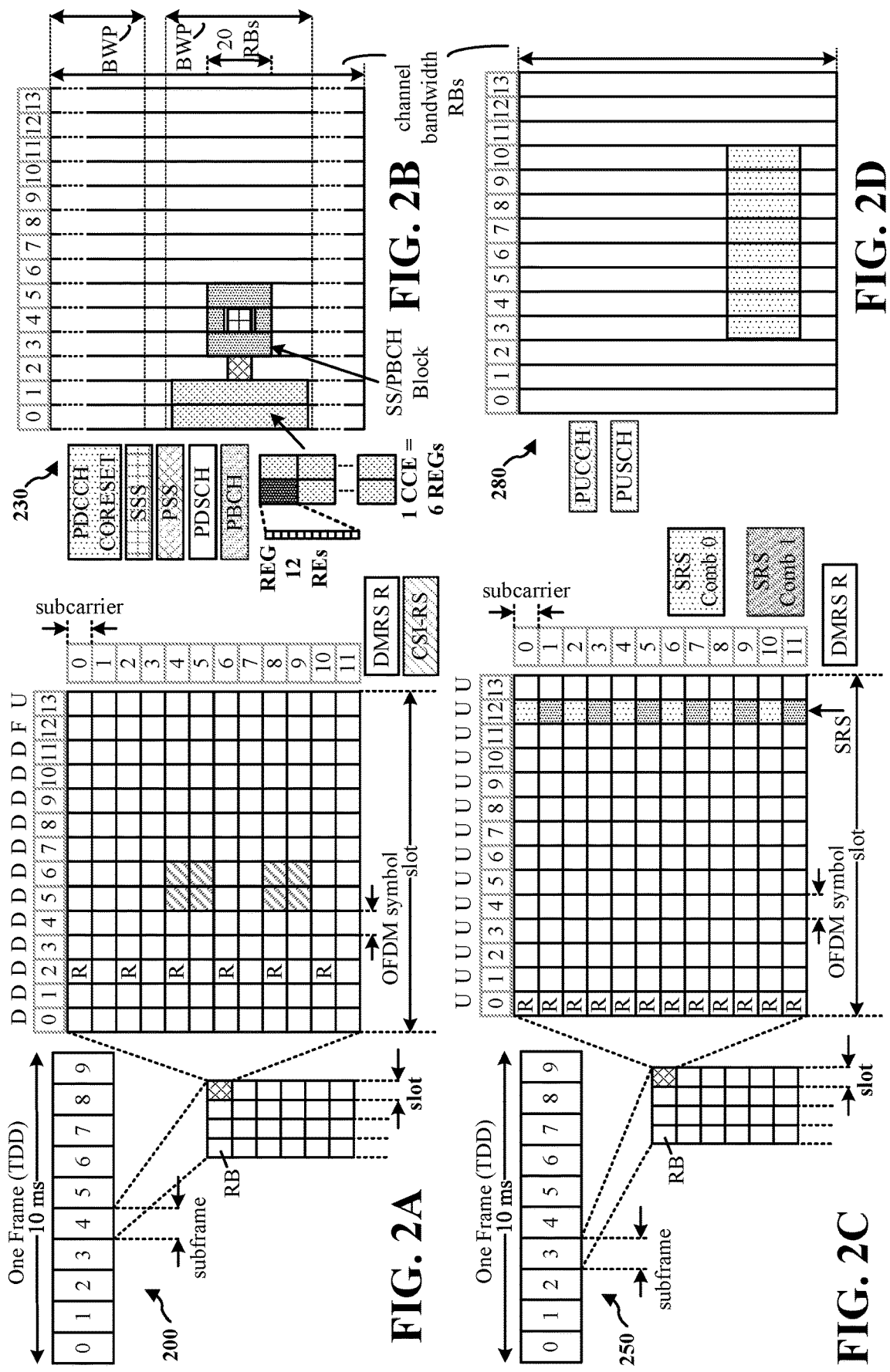
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
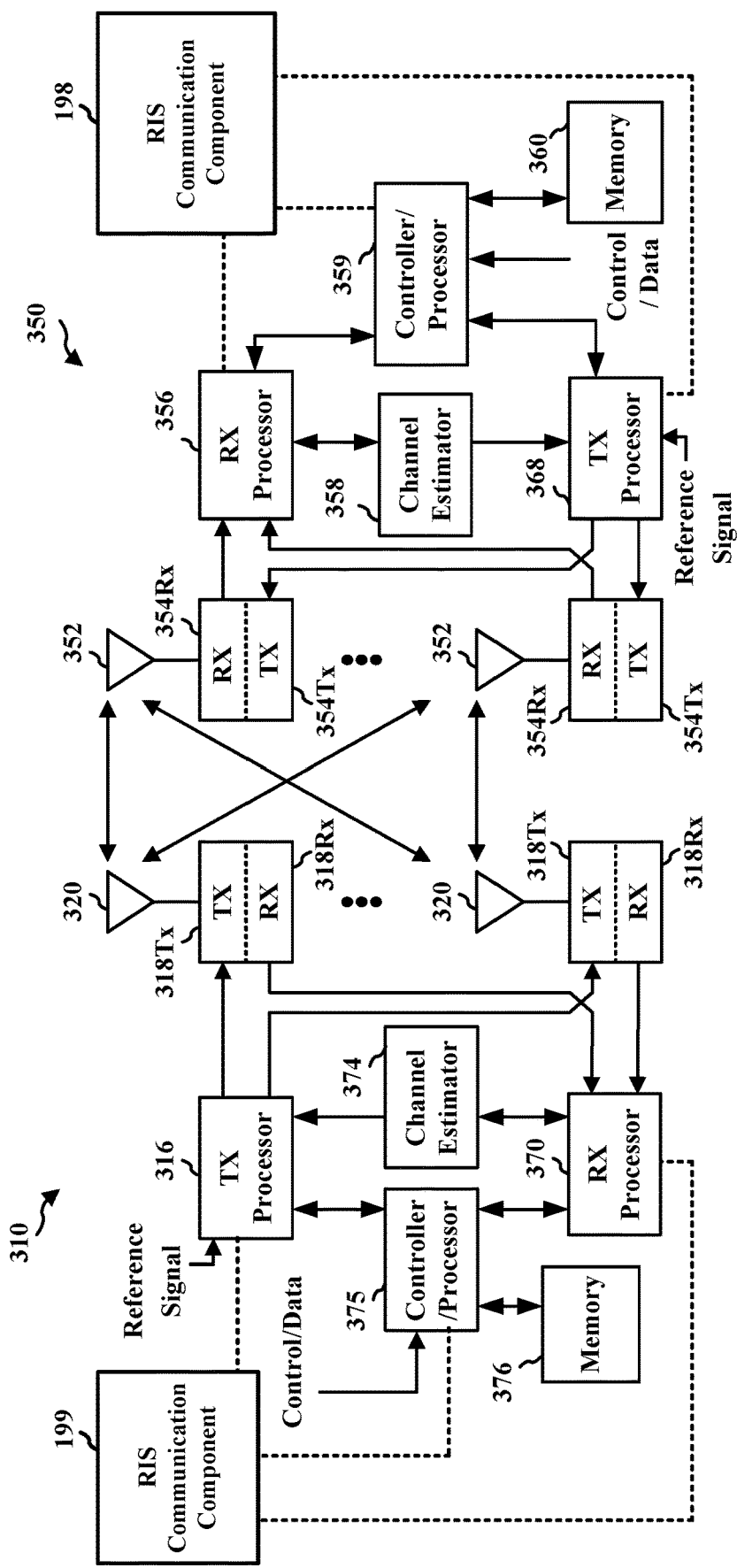
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RIS communication component 198 of FIG. 1.

At least one of the TX processor 316, the RX processor 370, and the controller/processor 375 may be configured to perform aspects in connection with the RIS communication component 199 of FIG. 1.

Figure 4:
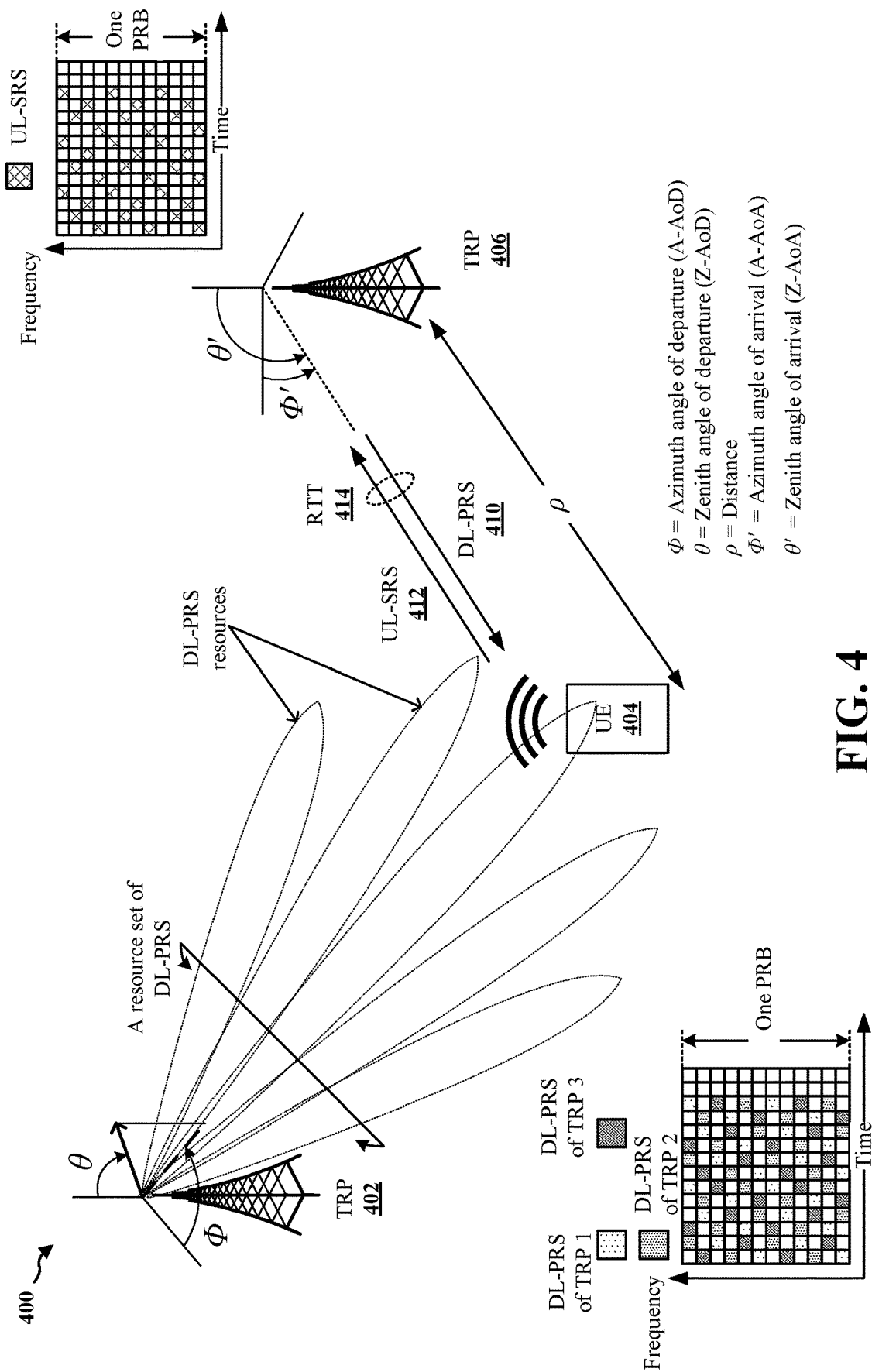
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For purposes of the present disclosure, the suffixes "-based" and "-assisted"

may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation." Also, when a UE positioning involves a reconfigurable intelligent surfaces (RIS), the UE positioning may also be referred to as RIS based UE positioning. For example, during an RIS based UE positioning, a UE may transmit SRS to a base station via an RIS and/or receive PRS from a base station via an RIS, etc.

In some scenarios, for UL based positioning, a UE may be configured to perform UL beam management for the SRS, such as by performing beam selection for SRS based on measurement of other reference signals. For example, there may be a spatial relationship between SRS and DL-PRS, SSB, or another SRS for positioning, where the UE may perform measurement for these reference signals and select one or more beams for transmitting the SRS based on the measurement. In some examples, this spatial relationship may be configured for the UE (e.g., by the serving base station, a location server, or an LMF, etc.). For example, a base station or an LMF may configure the UE with a spatial relation between a reference DL RS from serving cell and the target SRS for positioning for a UE, where the reference DL RS may include SSB, CSI-RS (e.g., NZP-CSI-RS-ResourceId), or PRS for positioning, etc. In another example, a base station or an LMF may configure the UE with a spatial relation between two SRS resources for positioning. If the spatial relationship is associated with an SSB (e.g., the SSB is used as the DL RS for the UL beam management), the SSB may be configured to include one or more of the followings: PCI of the cell; ssbFrequency with values: ARFCN-ValueNR; halfFrameIndex with values: 0 or 1; SSB-periodicity with values: ServingCellConfigCommon IE; ssbSubcarrierSpacing with values: SubcarrierSpacing IE; SFN-SSBoffset with values: {0, 1, 2, . . . 15}; Smtc per SSB frequency layer with values: SSB-MTC; SFN0 Offset per physical cell ID: Time offset of the SFN0 slot0 of a given cell with respect to the serving PCell; SSB Index; SS-PBCH-BlockPower (at least when SSB is used as pathloss-ReferenceRS for an SRS), etc.

Figure 5:
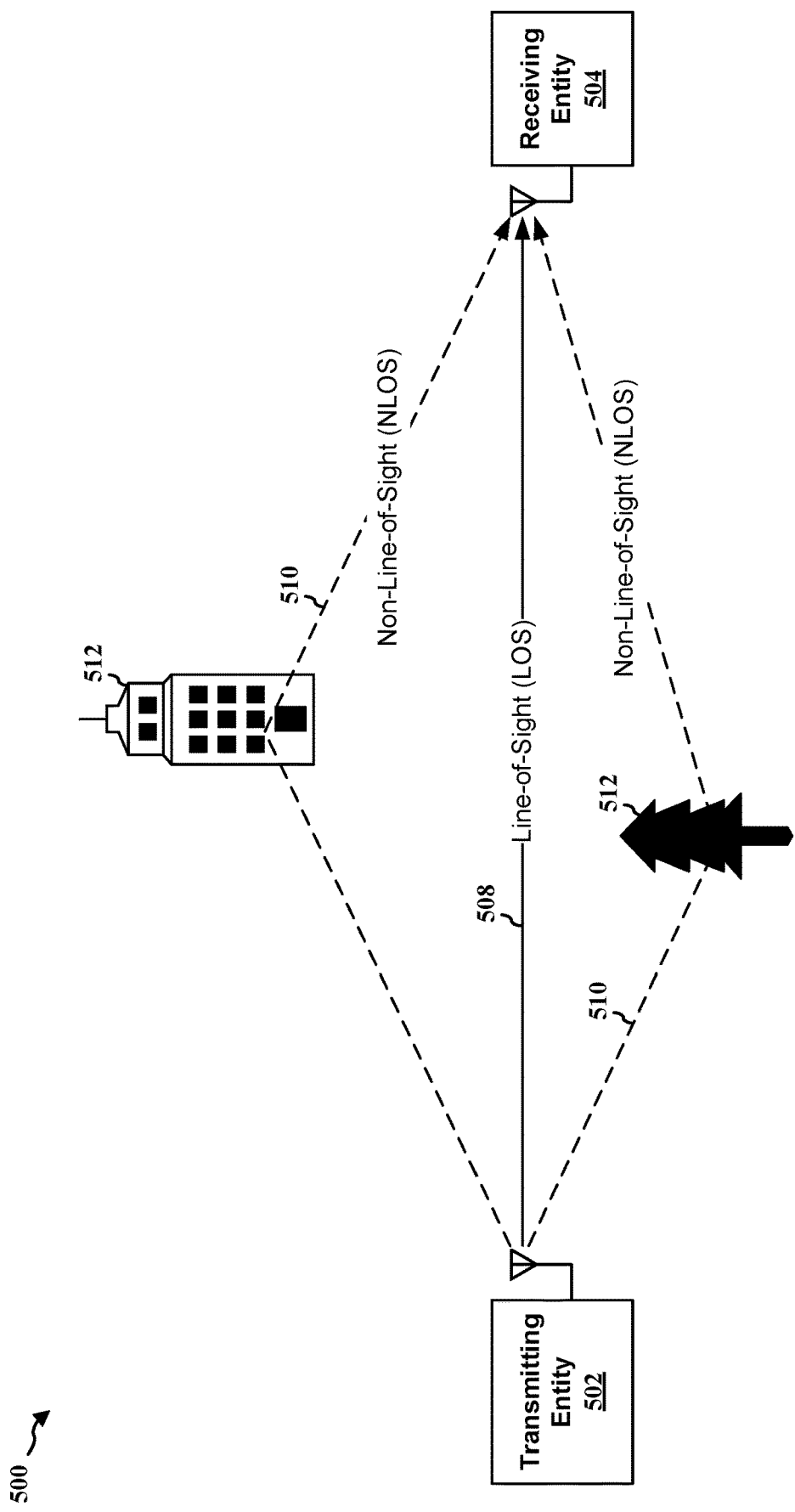
FIG. 5 is a diagram illustrating an example communication between wireless devices involving line-of-sight (LOS) and non-line-of-sight (NLOS) channels in accordance with various aspects of the present disclosure.

The accuracy of a UE positioning may be affected by whether the positioning entities (e.g., UEs, base stations, sidelink devices, etc.) are in a line-of-sight (LOS) condition or in a non-line-of-sight (NLOS) condition with each other. FIG. 5 is a diagram 500 illustrating an example communication between wireless devices involving LOS and NLOS channels in accordance with various aspects of the present disclosure. A transmitting entity 502 (e.g., a first UE, or a first base station, etc.) may be configured or scheduled to transmit data or reference signals (RSs) (e.g., positioning reference signals) to a receiving entity 504 (e.g., a second UE or a second base station, etc.). In some scenarios, as shown at 508, the data/RSs transmitted from the transmitting entity 502 may reach the receiving entity 504 directly without being obstructed by obstacle(s). In other scenarios, as shown at 510, the data/RSs transmitted from transmitting entity 502 may reach the receiving entity 504 indirectly via reflection, refraction, and/or penetration, etc. (e.g., one or more objects 512 may obstruct or may be within the transmission path of the data). As a signal traveling through an NLOS path/channel such as shown at 510 may reach the receiving entity 504 later and/or with a weaker power compared to a signal traveling through a LOS path/channel such as shown at 508 (e.g., a path/channel without obstructions), the time for signals travelling via an NLOS path/channel may also be longer. As such, a calculation or an estimation of a distance between the transmitting entity 502 and the receiving entity 504 may not be accurate if the calculation or the estimation of the distance is based on NLOS measurements.

For purposes of the present disclosure, a signal/data transmission without being obstructed by obstacle(s) may be referred to as a "LOS transmission," a "LOS signal/data," a "signal/data transmitted via an LOS path/channel," etc., whereas a signal/data transmission that is obstructed by obstacle(s) may be referred to as an "NLOS transmission," an "NLOS signal/data," a "signal/data transmitted via an NLOS path/channel," etc., (e.g., signal/data transmission involving reflection, refraction, and/or penetration, etc.). Signal reflection may be referring to a signal transmitted from a transmitter in a signal/beam path that is bounced off from one or more objects before reaching a receiver. Signal refraction may refer to a signal that is transmitted from a transmitter in a signal/beam path and changes its direction as it passes through an obstacle (e.g., a material or a medium in which the signal is able to pass/penetrate through) before reaching a receiver. Signal penetration may refer to a signal that is transmitted from a transmitter in a signal/beam path and penetrates an object or medium before reaching a receiver.

Figure 6:
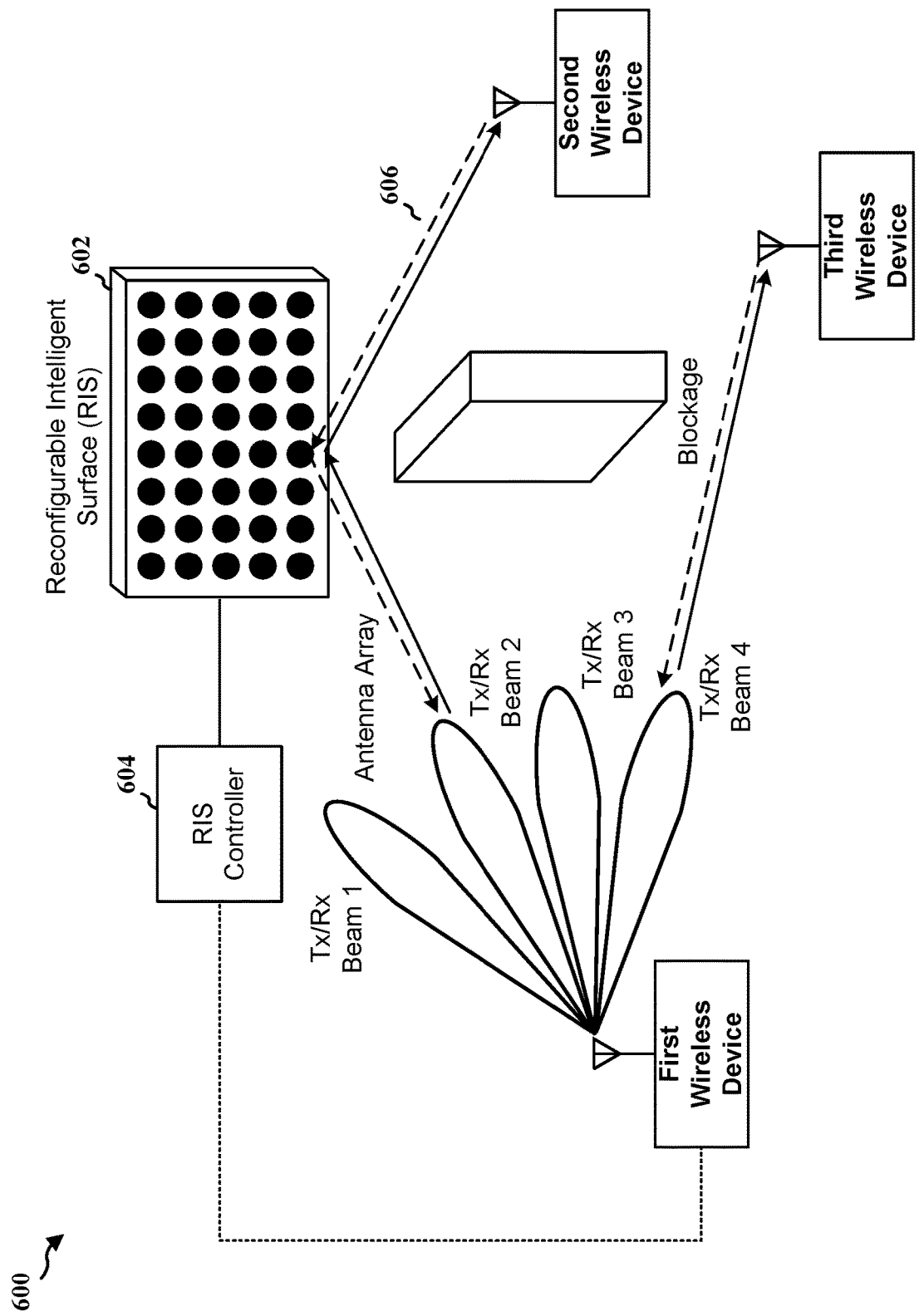
FIG. 6 is a diagram illustrating an example reconfigurable intelligent surface in accordance with various aspects of the present disclosure.

To improve communication between wireless devices that are in an NLOS condition (or not in a LOS condition), a reconfigurable intelligent surface (RIS) (which may also be referred to as a "reflection intelligent surface") may be used by the wireless devices to assist their transmission/reception (or relaying) of signals. FIG. 6 is a diagram 600 illustrating an example reconfigurable intelligent surface in accordance with various aspects of the present disclosure. As shown at 602, an RIS may be a planar structure that is engineered/configured to have properties that enable a dynamic control of the electromagnetic waves. For example, an RIS may be a node that is capable of receiving a signal from a first wireless device (e.g., a transmitter) and then re-radiating or reflecting the signal to a second wireless device (e.g., a receiver) with controllable time-delays. In another example, the RIS may be artificial structures with engineered electromagnetic (EM) properties, which may collect wireless signals from a transmitter and passively beamform them towards the desired receiver.

An RIS may include a phased array without a transceiver, and an RIS may be designed based on an antenna or a metamaterial, where the RIS may be configured to reflect or re-radiate a signal to one or more directions. For example, a phase shifting control may be integrated with an antenna panel to control the phase shifting of the antenna panel. An RIS may include multiple small elements that are associated with different time-delays and thereby the RIS may be capable of synthesizing a scattering behavior of an arbitrarily-shaped object of the same size. This feature may, for instance, be used to beamform a signal towards a receiving wireless device.

In some examples, as shown at 604, an RIS may further associate with an RIS controller, where the RIS controller may control the one or more antenna arrays to receive/reflect signal towards one or more directions. In one example, the control of the RIS may be based on a set of defined control voltages, where each control voltage may correspond to a specific reflection angle (which may be referred to as a "control voltage set"). For example, a first control voltage set may include a first control voltage (e.g., 0.25 V) that corresponds to a first reflection angle (e.g., 30°) or a first reflection coefficient, and a second control voltage set may include a second control voltage (e.g., 0.5 V) that corresponds to a second reflection angle (e.g., 45°) or a second reflection coefficient, etc. The number of control voltage sets available for each RIS may be limited. For example, an RIS may be limited with a maximum of ten or fifteen control voltage sets (e.g., for purposes of reducing the manufacturing cost).

An RIS controller may be able to communicate with other wireless nodes, e.g., a UE, a base station, an RSU, etc. As such, RIS may be employed to extend cellular systems coverage with negligible power consumption. In addition, RIS can be a near passive device that reflects impinging wave to a desired direction where the reflection direction is controlled by a base station. For example, in a cellular network, a network node (e.g., a base station) may control an RIS, where the network node may determine/configure one or more parameters for the RIS, such as an activation/deactivation time, a phase, beam direction(s), and/or beamforming weights used by the RIS, etc. The base station may indicate the determined/configured parameters to one or more UEs, and a UE may use the RIS to assist its transmission and/or reception of signal with other UE(s) based at least in part on the determined/configured parameters. A communication link between the base station and the RIS may be wired or wireless. In some examples, an RIS may function as a UE (e.g., the RIS includes hardware components and/or functions of a UE). In other examples, an RIS may be co-located or associated with a UE, such that the RIS may communicate with a base station or another UE via the UE.

As an RIS may be capable of reflecting or re-radiating signals to a different direction, the RIS may be used by wireless devices to turn an NLOS path/channel to a path/channel that is close or similar to a LOS path/channel by reflecting/relaying signals transmitted between wireless devices. For example, as shown at 606 of FIG. 6, a first wireless device may use an RIS to improve its communication with a second wireless device when the first wireless device and the second wireless device are in an NLOS condition (e.g., they are not in an LOS condition as between the first wireless device and the third wireless device), where the first wireless device may transmit signals to the second wireless device via the RIS and vice versa. The RIS may also be used by wireless devices to improve network coverage/throughput, and to reduce power consumption. For example, an RIS may be configured to reflect signals transmitted from a transmitting device toward a direction or an area that is not covered by the signals (e.g., a coverage hole, etc.) with less power compared to increasing the transmission power of the transmitting device.

Figure 7:
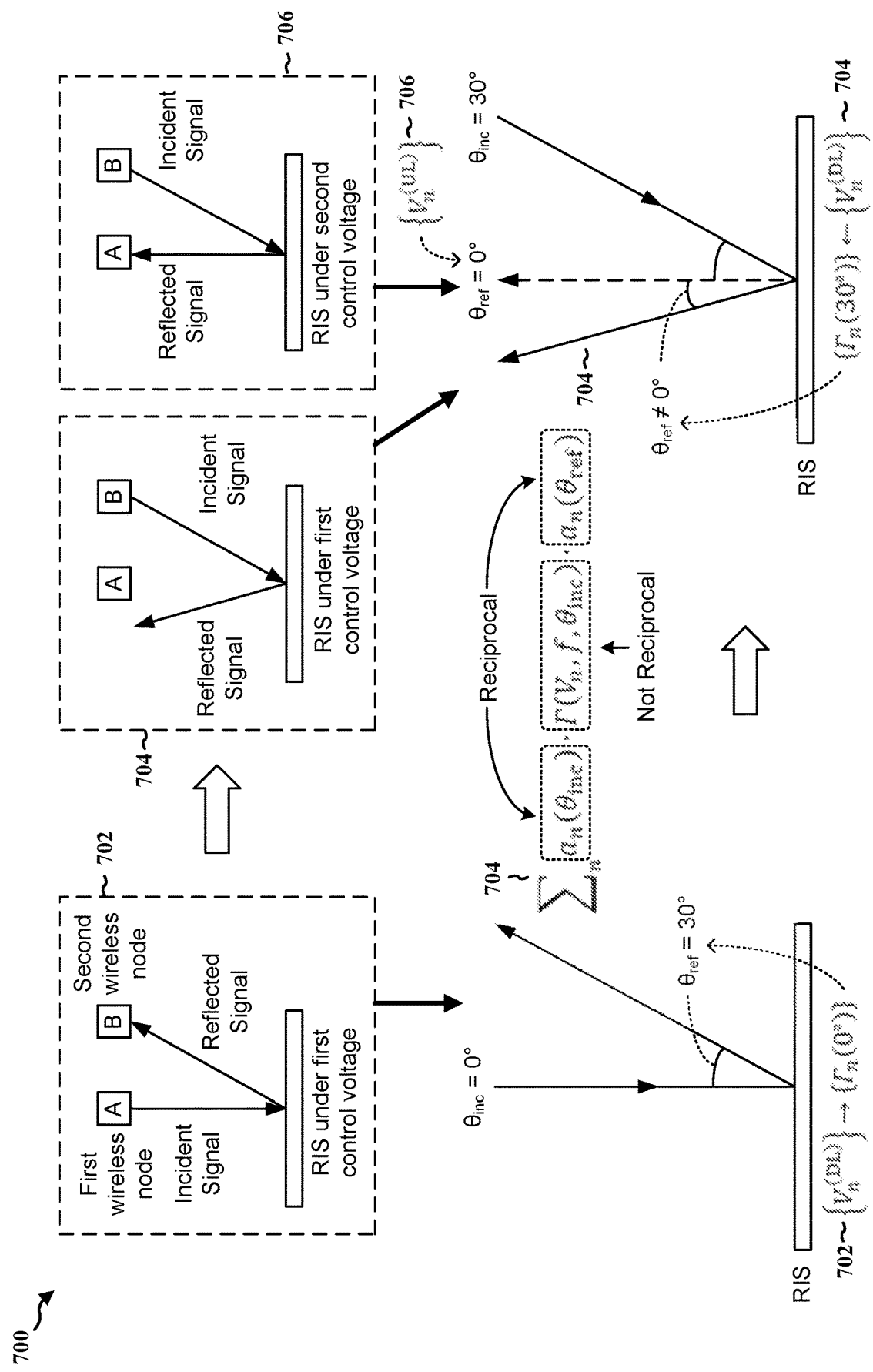
FIG. 7 is a diagram illustrating an example of reconfigurable intelligent surface (RIS) angle reciprocity between two wireless transmissions in accordance with various aspects of the present disclosure.

FIG. 7 is a diagram 700 illustrating an example of RIS angle reciprocity between two signal transmissions in accordance with various aspects of the present disclosure. In some scenarios, when two wireless nodes (e.g., UEs, base stations, RSUs, sidelink devices, or a combination thereof) are communicating with each other via an RIS, RIS angle reciprocity may not hold between the signal transmissions of the two wireless nodes. For example, as shown at 702, a first wireless node may transmit a first signal (which may be referred to as an incident signal) to an RIS from an incident angle of zero degrees (e.g., $\theta_{inc}=0°$) with respect to the RIS, and the RIS may reflect the first signal (which may be referred to as a reflected signal) to a second wireless node via a reflection angle of thirty degrees (e.g., $\theta_{ref}=30°$) with respect to the RIS, where the RIS may be operating at a first control voltage (e.g., $V_n^{(DL)}$) that corresponds to a first reflection angle/coefficient (e.g., a first control voltage set).

As shown at 704, in response to the first signal received, the second wireless node may transmit a second signal to the RIS via the direction in which the second wireless node receives the first signal, e.g., the second wireless node transmits the second signal at an incident angle of thirty degrees (e.g., $\theta_{inc}=30°$) with respect to the RIS. However, the second signal may not be reflected from the RIS at a reflection angle that is the same as the incident angle of the first signal with respect to the RIS. In other words, the second signal may be reflected to a different angle that is not zero degrees (e.g., $\theta_{ref}\neq0°$ with respect to the RIS if the RIS is operating at the first control voltage (e.g., $V_n^{(DL)}$) that corresponds to the first reflection angle/coefficient. As such, the first wireless node may not receive the second signal or may receive the second signal with degradation.

As shown at 706, for the RIS to reflect the second signal at the reflection angle of zero degrees (e.g., $\theta_{ref}=0°$) with respect to the RIS (e.g., for angle reciprocity to hold), the RIS may be specified to operate at a second control voltage (e.g., $V_n^{(UL)}$) that corresponds to a second and different reflection coefficient (e.g., a second control voltage set). Thus, for the first wireless node and the second wireless node to maintain beam correspondence for their communication, a pair of control voltage sets may be specified at the RIS (e.g., the first control voltage set $\{V_n^{(DL)}\}$ for $\theta_{inc}\rightarrow\theta_{ref}$, and the second control voltage set $\{V_n^{(UL)}\}$ for $\theta_{ref}\rightarrow\theta_{inc}$). Beam correspondence may refer to two wireless nodes communicating with each other using same set of beams or beam directions for transmission and reception. For example, a beam correspondence between a base station and a UE may refer to beams selected for downlink transmission and reception can also be used for uplink transmission and reception.

Figure 8:
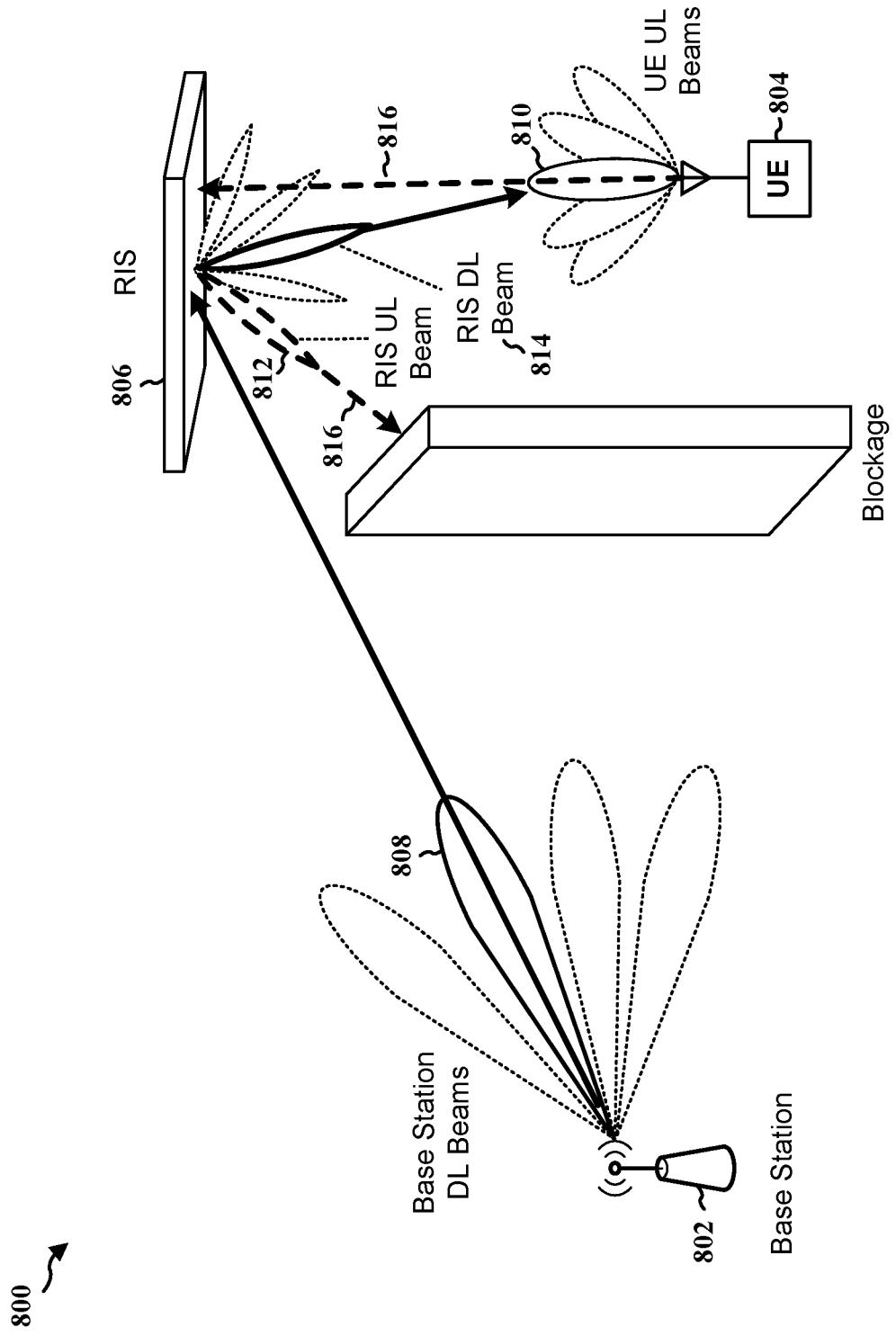
FIG. 8 is a diagram illustrating an example communication between a base station and a UE via an RIS in accordance with various aspects of the present disclosure.

FIG. 8 is a diagram 800 illustrating an example communication between a base station 802 (e.g., a first wireless node) and a UE 804 (e.g., a second wireless node) via an RIS 806 in accordance with various aspects of the present disclosure. For purposes of the present disclosure, as shown at 808, a beam that is used by the base station 802 for transmitting signals to the UE 804 (or to the UE 804 via the RIS 806) may be referred to as a base station DL beam. As shown at 810, a beam that is used by the UE 804 for transmitting signals to the base station 802 (or to the base station 802 via the RIS 806) may be referred to as a UE UL beam. As shown at 812, a beam that is used by the RIS 806 for transmitting signals to the base station 802 (e.g., for reflecting signals from the UE 804 to the base station 802) may be referred to an RIS UL beam or an RIS UL transmission beam, and as shown at 814, a beam that is used by the RIS 806 for transmitting signals to the UE 804 (e.g., for reflecting the signals from the base station 802 to the UE 804) may be referred to an RIS DL beam or an RIS DL transmission beam.

In some scenarios, beams or beam pairs between the base station 802 and the RIS 806 (e.g., between base station DL beams and RIS UL beams) may be maintained or fixed to provide the best link quality between the base station 802 and the RIS 806 as they are more likely to be in a fixed position. For example, a set of RIS UL reception beams (e.g., RIS beams that are used for receiving signals from the UE UL beams) of the RIS 806 may be configured to be fixed and mapped to one or more pairs of control voltage sets. For example, an RIS UL reception beam may be pointing at a first direction with respect to the RIS, and may correspond to a first pair of control voltage sets, e.g., one control voltage set for reflecting signals received from the base station 802 to a specific angle (e.g., 45°) and one control voltage set for reflecting signals received at the specific angle (e.g., 45°) back to the base station 802, etc.

In one example, as shown at 816, when there is a mismatch between RIS DL/UL beams (e.g., fixed beams) and UE UL beams (e.g., not fixed in most cases), the quality of the UL communication (e.g., the SNR) may drop dramatically, especially if the UE 804 is in a blockage area (e.g., the base station 802 and the UE 804 are not in a LOS condition). Mismatch of beams may refer to that the UE UL beam(s) are not aligned with corresponding RIS DL beam(s). For example, a mismatch of beams may occur when the RIS 806 transmits/reflects signals to the UE 804 via an RIS DL beam at an angle of 30° with respect to the RIS 806, and in response, the UE 804 transmits signals to the RIS 806 via a UE UL beam at an angle of 0° with respect to the RIS 806. As such, while the RIS UL beam control voltage may be fixed, the UE UL beams may not perfectly match with the RIS UL reception beam in many instances due to the mobility of the UE 804. In some scenarios, such mismatch between the RIS UL reception beams and the UE UL beams may result the UE UL beams being reflected to a blockage area or an area not directed to the base station 802, such as shown at 816. As discussed in connection with FIG. 6, in some scenarios, there may be a limited number of control voltage sets available for an RIS. For example, in a typical implementation, there may be just one limited pair of control voltage sets configured for a limited number of beam correspondence (e.g., in DL and UL). As such, it may be difficult for the base station 802 and the UE 804 to maintain beam correspondence when a mismatch between RIS DL/UL beams and UE UL beams occurs.

Aspects presented herein may improve the performance and accuracy of a UE positioning based on RIS, such as when the RIS has a limited number of control voltage sets available. Aspects presented here may also improve the beam correspondence between a base station and a UE when the base station and the UE are communicating with each other via an RIS.

In one aspect of the present disclosure, a UE may leverage the high accuracy of UE DL-AoD estimation/calculation, and the UE may adjust the direction of its UL beam(s) (e.g., UE UL beams) to align with the RIS DL beam(s) based on the DL-AoD estimation/calculation to achieve beam correspondence with a base station. Such configuration may enable the RIS to use just one pair of control voltage set. As the DL-AoD for an RIS DL beam does not rely on UE UL reception (e.g., reception of a UE UL beam at the RIS), it may avoid the UE UL beam quality loss due to beam mismatch. Note that the UL-AoA based method (e.g., angle of arrival for a UE UL beam at the RIS) may be less suitable for calculating the DL-AoD of the RIS DL beam as it may rely on the UE UL reception (which may become inaccurate if beam mismatch occurs). For example, a network node (e.g., a base station, a location server, an LMF, etc.) may signal beam pattern information associated with RIS DL beams of an RIS to a UE, where the UE may be performing a UE positioning with a base station or communicating with the base station via the RIS. The beam pattern information may include beam patterns and/or information related to RIS DL beams of the RIS, such as angles, strength, number of arrays, beam width (e.g., 3-dB beam width), and/or bore sight direction(s), etc., of the RIS DL beams. In some examples, the beam pattern information may further include beam patterns/information for various DL beams/signals, such as beam patterns/information for PRS, SSB, and/or CSI-RS, etc. (e.g., which beams are transmitting which DL signals, periodicities of DL signals, resources used by the DL signals, etc.) For example, beam patterns for one or more DL signals may be signaled to the UE if they are quasi-co-located (QCLed) with the SRS transmitted from the UE. Then, the UE may determine/calculate the AoD of one or more RIS DL beams based on the beam pattern information (e.g., such as for UE based AoD positioning).

In one example, the UE may calculate/estimate the direction for transmitting one or more UL beams based on RSRP measurements (which may be referred to as RSRP based direction estimation). For example, the UE may measure the RSRP for a set of (or all of) PRS/RIS DL beams. Based on the knowledge of the beam patterns of all the PRS/RIS DL beams, the UE may match the relative RSRP between different beams with a database formulated based on the PRS/RIS DL beam patterns. So, there is a mapping between the direction for transmitting one or more UL beams and the database formulated by all PRS/RIS DL beam patterns. Such RSRP based direction estimation method may specify the base station to include additional information beyond the boresight information of the RIS DL beams in the beam pattern information, such as information associated with DL signals transmitted from the RIS DL beams. As such, additional signaling may be specified/configured between the base station and the UE. For purposes of the present disclosure, boresight information may refer to information that enable a transmitting device/node, such as a UE or a base station, to adjust its transmission (Tx) beam (or to transmit signals) to a specified direction. For example, boresight information may include the azimuth angle and the elevation angle of an RIS DL beam. In addition, when two beams are aligned, it may indicate that the two beams have close (e.g., within a threshold) or identical Tx/Rx angles with respect to each other or to a reference point. For example, when an RIS transmits/reflects signals to a UE via an RIS DL beam at an angle of 30° with respect to the RIS, and in response, the UE transmits signals to the RIS via a UE UL beam also at an angle of 30° (or 30°+/−X° for a more flexible deployment) with respect to the RIS, the UE UL beam may be deemed to align with the RIS DL beam. In other examples, two beams may be aligned when they are parallel to each other or are pointing toward each other. For example, a Tx beam of a first wireless device may be aligned with an Rx beam of a second wireless device if both beams are pointing toward each other to establish a communication link.

In another example, the UE may use an Rx digital beamforming-based method to calculate/estimate the direction for transmitting one or more UE UL beams. For example, the UE may capture a set of samples transmitted from another wireless device/node, then the UE may apply different Rx beams to the set of samples (called digital Rx beamforming) to find an Rx beam that is closest to the direction from the RIS to the UE. Such direction calculation/estimation method may specify just boresight information of the RIS DL beams, which may use less signaling overhead between the UE and the base station compared to the RSRP based direction estimation (but may also specify higher UE capabilities).

In one aspect, the UE may indicate which direction calculation/estimation method is used or recommended by the UE, and the UE may receive the corresponding beam pattern information based on the indication. For example, the UE may indicate the method used for calculating/estimating the direction for transmitting its UL beams to a network (e.g., base station, a location server, or an LMF, etc.) via a UE capability report or via a dedicated signaling (e.g., RRC signaling), and then the UE may receive corresponding beam pattern information (e.g., via assistance data) from the network that may be used for calculating/estimating the direction for transmitting its UL beams. In some scenarios, the UE may also be specified to support a specific method/mechanism of calculating/estimating the direction for transmitting its UL beams. For example, the UE may be specified to support the capability of Rx digital beamforming-based method for calculating the direction for transmitting its UL beams (e.g., antenna array capability for Rx beamforming and array orientation calibration). If the UE does not support such direction calculation/estimation method, the UE may be refrained from estimating the direction for transmitting its UL beams.

In another example, the UE may be assumed to be using one of the direction estimation/calculation methods by default unless the UE indicates otherwise. For example, by default, the UE may be assumed to use RSRP based direction estimation as such method/mechanism may have a lower specification on the UE side compared to the Rx digital beamforming-based method (e.g., RSRP based direction estimation is more likely to be performed by UEs without high capabilities). However, if the UE indicates that it has the capability to support the digital Rx beamforming-based method, the assistance data signaling may be reduced greatly, as just the beam boresight information may be specified for the UE.

Based on the direction estimated/calculated by the UE for transmitting its UL beams, the UE may adjust its UE UL beam(s) or beam transmissions to align with the boresight direction of the one or more RIS DL beams (e.g., the RIS DL beam(s) that are used for reflecting the signals from the base station). In some examples, the UE may specify real-time antenna panel/UE orientation calibration in order to maintain beam alignment between the UE and the RIS.

By enabling a UE to estimate the direction for transmitting its UL beams based on the beam pattern information associated with the RIS and measurements for the RIS DL beams, the UE may be able to maintain a beam correspondence with a base station via the RIS without specifying a high number of control voltages sets at the RIS. For example, just one pair of control voltage sets may be specified at the RIS, which may include a first control voltage set for reflecting signals received from the base station to the UE via an RIS DL beam and a second control voltage set for reflecting signals received from the UE back to the base station, such as shown at 706 of FIG. 7. As such, positioning of the UE and/or communication between the base station and the UE based on RIS may be improved.

In another aspect of the present disclosure, the network may not be specified to signal the beam pattern information associated with the RIS DL beams to the UE. Instead, the UE may report the RSRP measurements for one or more RIS DL beams to the network. Then, the network may derive an angle difference between the RIS DL beams and the AoD of UE based on the RSRP measurements, and the network may signal the derived angle of difference to the UE. Then, the UE may adjust its UE UL beam(s) or beam transmissions to align with the RIS DL beam(s) based on the angle of difference. This configuration may be suitable when a base station is unable to provide beam pattern information for the RIS (e.g., the beam pattern information associated with the RIS is proprietary).

Figure 9:
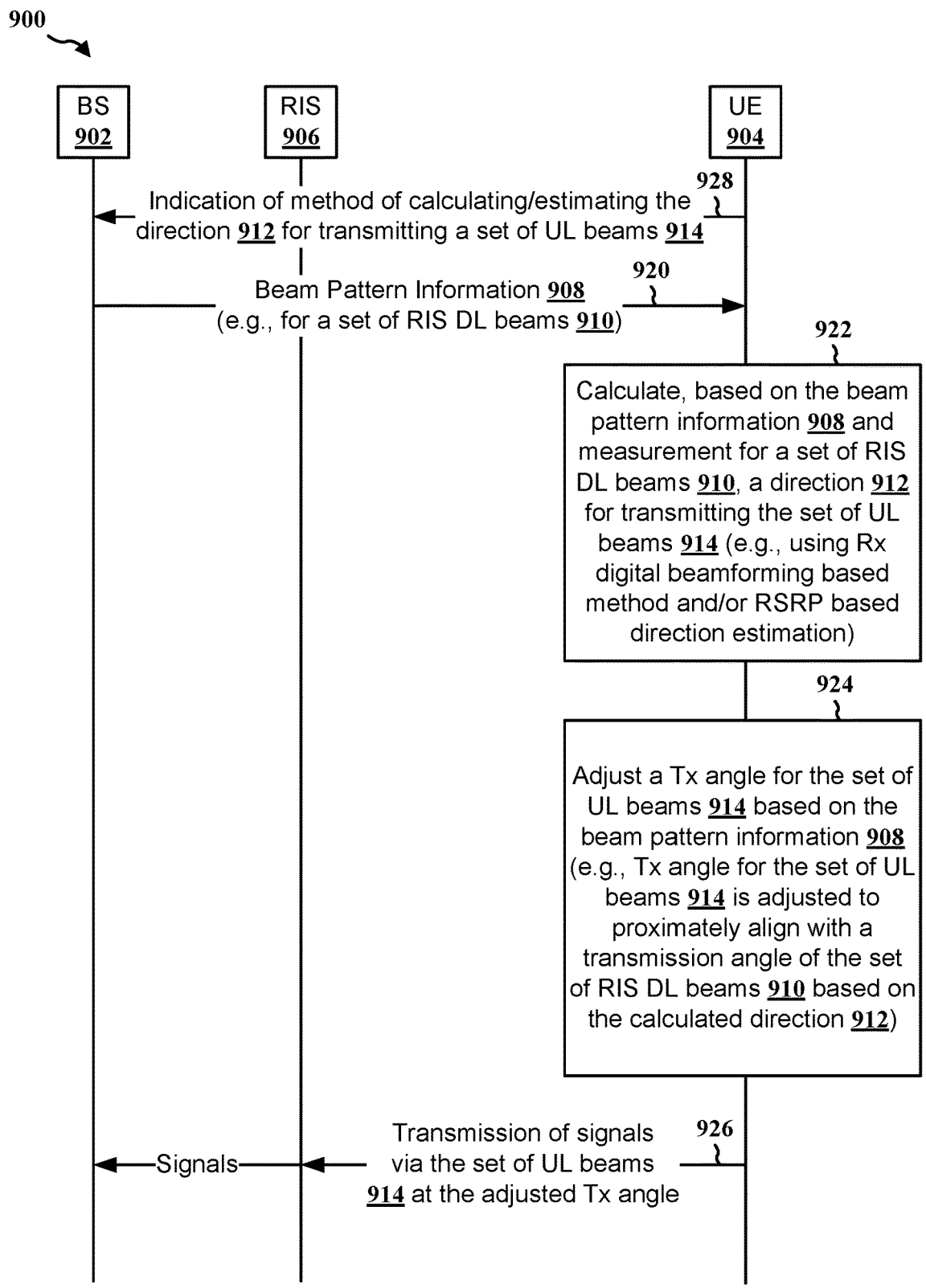
FIG. 9 is a communication flow illustrating an example of a UE estimating and adjusting its UL beam(s) to align with DL beam(s) of an RIS based on beam pattern information associated with the RIS in accordance with various aspects of the present disclosure.

FIG. 9 is a communication flow 900 illustrating an example of a UE estimating and adjusting its UL beam(s) to align with DL beam(s) of an RIS based on beam pattern information associated with the RIS in accordance with various aspects of the present disclosure. The numberings associated with the communication flow 900 do not specify a particular temporal order and are merely used as references for the communication flow 900. Aspects presented herein may enable a UE to maintain beam correspondence with a base station via an RIS with a limited number of control voltage sets (e.g., with one pair of control voltage set).

At 920, a base station 902 may be communicating with a UE 904 via an RIS 906, such as described in connection with FIG. 8, and the base station 902 may transmit, to the UE 904 (e.g., directly or via the RIS 906), beam pattern information 908 that is associated with a set of RIS DL beams 910 of the RIS 906.

At 922, based on the beam pattern information 908 and measurement for the set of RIS DL beams 910 (e.g., the UE 904 may perform measurement(s) for the set of RIS DL beams 910 prior to 922), the UE 904 may calculate a direction 912 for transmitting a set of UL beams 914 (i.e., UE UL beams). In one example, for the UE 904 to calculate the direction 912, the beam pattern information 908 may include beam patterns of one or more DL signals, such as beam pattern(s) for PRS, SSB, and/or CSI-RS. As described above, the UE 904 may calculate the direction 912 for transmitting the set of UL beams 914 by measuring the set of RIS DL beams 910 using Rx digital beamforming-based method and/or RSRP based direction estimation method.

In one example, as shown at 928, the UE 904 may indicate the method it is going to use for calculating the direction 912 or the method it recommends for calculating the direction 912. In one example, the indication may be based on the capability of the UE 904 (e.g., whether the UE 904 supports a specified method of calculating the direction 912). Based on the indication, the base station 902 may include corresponding information that may be used by the UE 904 for calculating the direction 912 using the method specified by the UE 904 in the beam pattern information 908. For example, if the UE 904 specifies that it is calculating the direction 912 using the RSRP based direction estimation, the base station 902 may include beam patterns of one or more DL reference signals in the beam pattern information 908.

At 924, after calculating the direction 912 for transmitting the set of UL beams 914, the UE 904 may adjust a Tx angle for the set of UL beams 914 (e.g., beams used for communicating with the base station 902) based on the calculated direction 912 (e.g., based on the beam pattern information 908 and measurements for the set of RIS DL beams 910). For example, the UE 904 may adjust the Tx angle for the set of UL beams 914 to align or to proximately align (e.g., with a range, such as X°+/−Y°) with a transmission angle of the set of RIS DL beams 910 based on the calculated direction 912 for transmitting the set of UL beams 914.

At 926, the UE 904 may transmit, via the RIS 906, signals/transmissions from the set of UL beams 914 to the base station 902 based on the adjusted Tx angle. As such, the UE 904 may be able to maintain a beam correspondence with the base station 902 via the RIS 906 using one pair of control voltages sets at the RIS 906.

Figure 10:
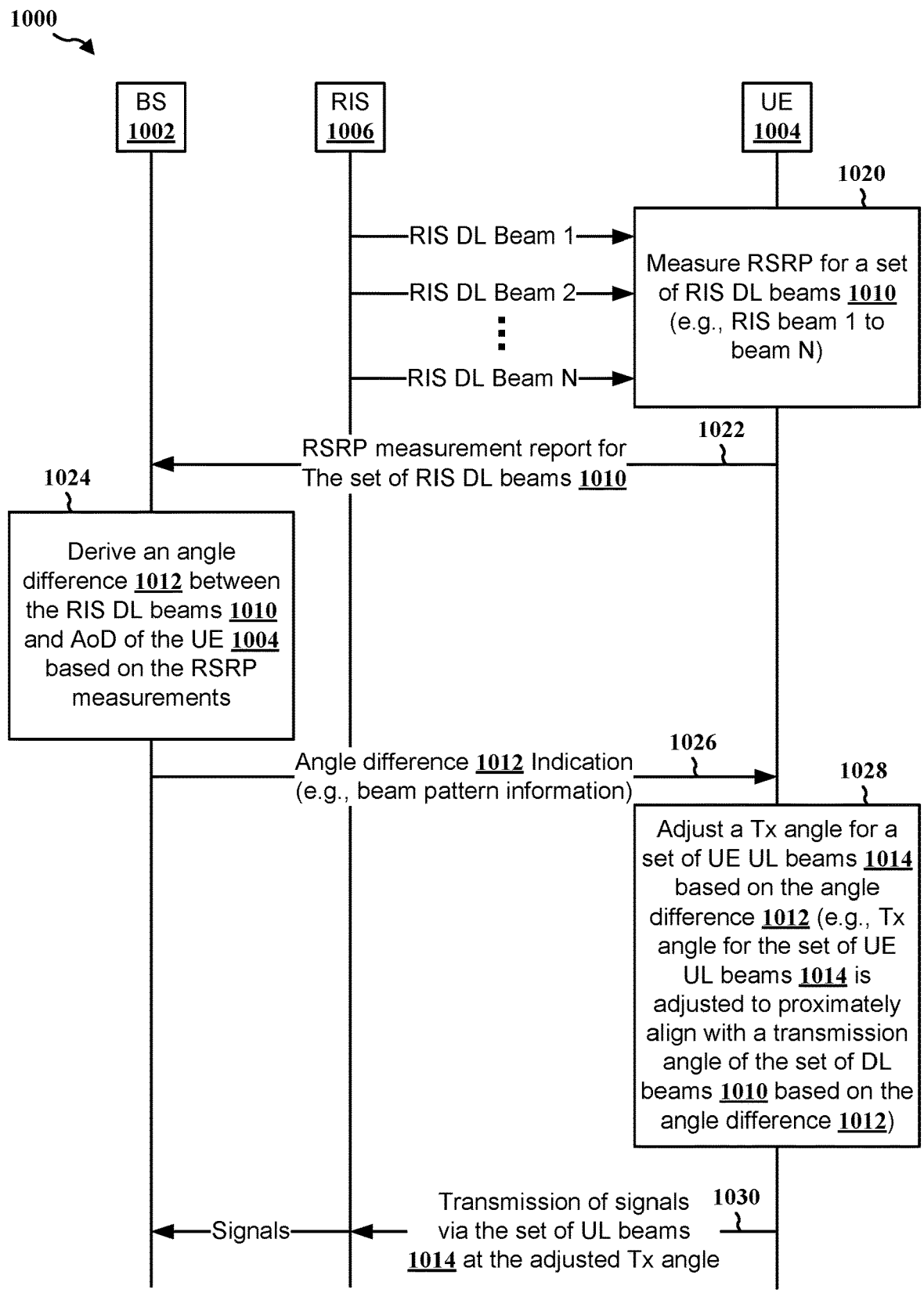
FIG. 10 is a communication flow illustrating an example of a UE estimating and adjusting its UL beam(s) to align with DL beam(s) of an RIS based on beam pattern information associated with the RIS in accordance with various aspects of the present disclosure.

FIG. 10 is a communication flow 1000 illustrating an example of a UE estimating and adjusting its UL beam(s) to align with DL beam(s) of an RIS based on beam pattern information associated with the RIS in accordance with various aspects of the present disclosure. The numberings associated with the communication flow 1000 do not specify a particular temporal order and are merely used as references for the communication flow 1000. Aspects presented herein may enable a UE to maintain beam correspondence with a base station via an RIS with a limited number of control voltage sets (e.g., with one pair of control voltage set).

At 1020, a UE 1004 may measure RSRP for a set of RIS DL beams 1010 from an RIS 1006, where the UE 1004 may be communicating with a base station 1002 via the RIS 1006.

At 1022, the UE 1004 may report the RSRP measurement for the set of RIS DL beams 1010 to the base station.

At 1024, after receiving the RSRP measurement for the set of RIS DL beams 1010, the base station 1002 may calculate and derive an angle difference 1012 between the RIS DL beams 1010 and AoD of the UE 1004 based on the RSRP measurements.

At 1026, the base station 1002 may indicate the derived angle difference 1012 to the UE 1004.

At 1028, after receiving the angle difference 1012 indication, the UE 1004 may adjust a Tx angle for a set of UE UL beams 1014 based on the angle difference 1012. For example, the UE 1004 may adjust the Tx angle for the set of UE UL beams 1014 to proximately align with a transmission angle of the set of DL beams 1010 based on the angle difference 1012.

At 1030, the UE 1004 may transmit, via the RIS 1006, signals/transmissions from the set of UE UL beams 1014 to the base station 1002 based on the adjusted Tx angle. As such, the UE 1004 may be able to maintain a beam correspondence with the base station 1002 via the RIS 1006 using one pair of control voltages sets at the RIS 1006.

Aspects described in connection with FIGS. 9 and 10 may not specify an RIS to perform any adaptation, but may specify UL beam adaptation at a UE. In other words, most configurations may be specified at the UE side and not on the RIS side. However, in some scenarios, a UE may not be able to perform the UL beam adaptation described in connection with FIGS. 9 and 10, such as a UE that is incapable of calculating or estimating the direction of its UE UL beams(s) or a UE that is configured to follow a specified UL beam management procedure without specifying additional beam refinement.

Aspects presented herein may enable an RIS to perform RIS beam adaptation for RIS UL beam refinement, such that a beam correspondence may be maintained between a UE and a base station without specifying the UE to perform UE UL beam adaptation/management. For example, in one example, an RIS may be configured to optimize its control voltages to maintain the best UL quality or maintain an UL quality above a quality threshold.

Figure 11:
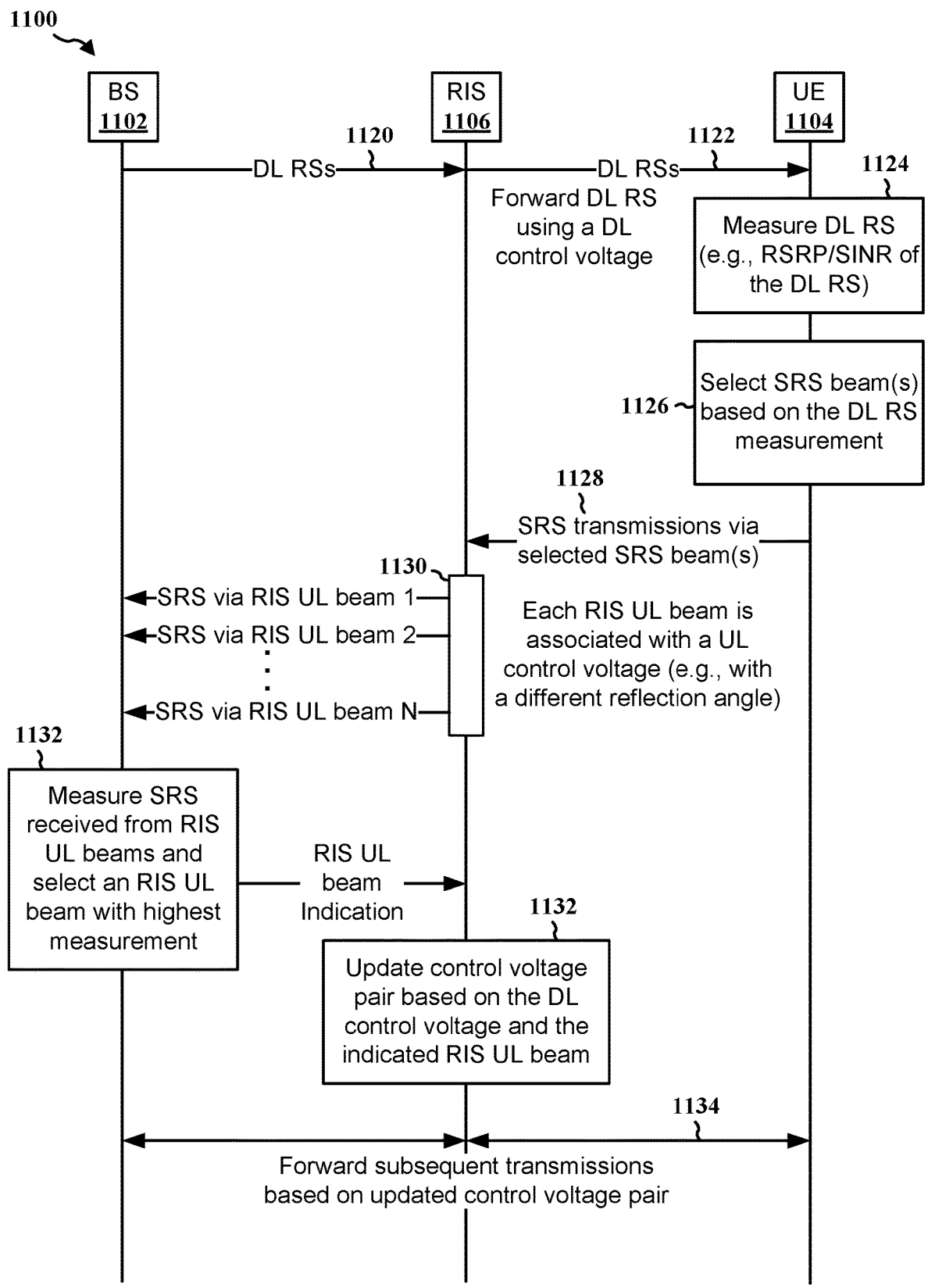
FIG. 11 is a communication flow illustrating an example of an RIS performing an RIS beam adaptation for beam refinement in accordance with various aspects of the present disclosure.

FIG. 11 is a communication flow 1100 illustrating an example of an RIS performing an RIS beam adaptation for beam refinement in accordance with various aspects of the present disclosure. The numberings associated with the communication flow 1100 do not specify a particular temporal order and are merely used as references for the communication flow 1100. Aspects presented herein may enable an RIS to maintain beam correspondence between a base station and a UE based on the RIS training/adaptation.

At 1120, a base station 1102 may transmit a set of DL RSs to an RIS 1106, which is to be forwarded to a UE 1104.

At 1122, the RIS 1106 may forward the DL RSs to the UE based on a first DL control voltage (e.g., based on a first reflection angle or a first RIS DL beam).

At 1124, after receiving the DL RSs from the RIS 1106, the UE 1104 may measure the DL RSs using a set of UE reception beams. For example, the UE 1104 may measure the RSRP or the signal-to-interference-plus-noise ratio (SINR) of the DL RSs using a set of UE reception beams.

At 1126, the UE 1104 may select one or more SRS beams (e.g., UL beams for transmitting SRS) for communicating with the base station 1102 via the RIS 1106. For example, the UE 1104 may measure the RSRP for DL RSs transmitted/reflected from the RIS 1106, and the UE 1104 may select an SRS beam that corresponds to a UE reception beam with highest RSRP measurement.

At 1128, after selecting the SRS beam(s) based on the DL RS measurement, the UE 1104 may repeat SRS transmissions to the RIS 1106 using the selected SRS beam(s) for RIS training. In one example, the UE 1104 may be specified to maintain the same SRS beam(s) for transmitting the SRS with repetitions during the RIS training phase for a specified duration. Thus, the UE 1104 may be configured to report, to the base station 1102, a location server, or an LMF, its capability on the maximum duration in which the SRS beam(s) may be maintained, where the capability may be in the unit of slot (e.g., X slots). In addition, repetition factors for transmitting the SRS with repetitions may be determined by the UE 1104, the base station 1102, the location server, and/or the LMF based on the capabilities of the UE and/or the RIS (e.g., the RIS may be able to support just a limited number of control voltages).

At 1130, after receiving the SRS transmissions from the UE 1104, for each SRS reflection (e.g., reflection of an SRS transmission received from the UE 1104 to the base station 1102), the RIS 1106 may use a different control voltage (e.g., an UL control voltage) to enable a different reflection coefficient (e.g., to reflect the SRS transmission with a different reflection angle to the base station 1102).

At 1132, based on the reflected SRS transmissions received, the base station 1102 may evaluate which RIS UL beam provides the best/highest UL quality based on the beam measurement (e.g., RSRP or SINR measurement), and the base station may select the best RIS UL beam that provides the best/highest UL quality and indicate the selected RIS UL beam to the RIS 1106.

At 1132, in response to the RIS UL beam indication from the base station 1102, the RIS 1106 may update its pair of control voltage sets mapped to the corresponding beam correspondence. For example, the RIS 1106 may update the pair of control voltage sets between the base station 1102 and the UE 1104 based on the DL control voltage (e.g., obtained at 1122) and the control voltage associated with the RIS UL beam (e.g., obtained at 1130).

At 1134, a beam correspondence may be maintained between the base station 1102 and the UE 1104 by adjusting the control voltage at the RIS for RIS reflection. For example, the RIS 1106 may forward subsequent transmissions between the base station 1102 and the UE 1104 based on the updated control voltage pair to maintain the beam correspondence.

In some examples, the RIS may include a number of default control voltage sets, and the base station may trigger the RIS training/adaptation by cable-based control or over-the-air (OTA) based control (e.g., such as DCI based triggering). In another example, the UE may on-demand request the RIS training/adaptation (e.g., the training/adaptation is triggered by UE).

Figure 12:
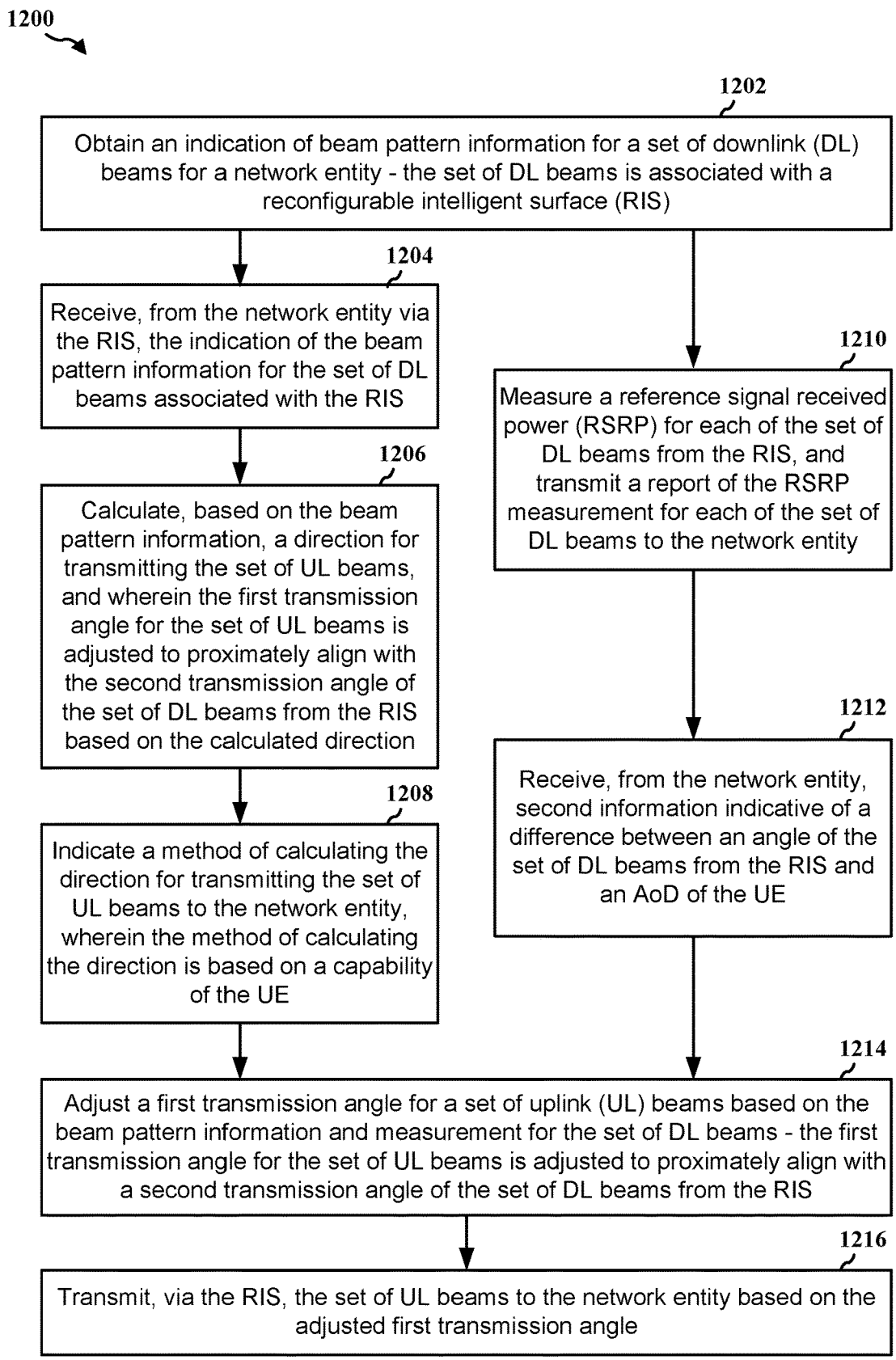
FIG. 12 is a flowchart of a method of wireless communication.

FIG. 12 is a flowchart 1200 of a method of wireless communication. The method may be performed by a UE (e.g., the UE 104, 404, 804, 904, 1004, 1104; the apparatus 1404). The method may enable the UE to maintain beam correspondence with a base station via an RIS that has a limited number of control voltage sets (e.g., with one pair of control voltage set).

At 1202, the UE may obtain an indication of beam pattern information for a set of DL beams for a network entity, where the set of DL beams is associated with an RIS, such as described in connection with FIGS. 9 to 10. For example, at 920 of FIG. 9, the UE 904 may receive beam pattern information 908 from the base station 902 associated with a set of RIS DL beams. The reception of indication of beam pattern information may be performed by, e.g., the RIS communication component 198, the cellular baseband processor 1424, and/or the transceiver(s) 1422 of the apparatus 1404 in FIG. 14.

In one example, at 1204, to obtain the indication of the beam pattern information, the UE may receive, from the network entity via the RIS, the indication of the beam pattern information for the set of DL beams associated with the RIS, such as described in connection with FIGS. 9 to 10. For example, at 920 of FIG. 9, the UE 904 may receive beam pattern information 908 from the base station 902 associated with a set of RIS DL beams. The reception of indication of beam pattern information may be performed by, e.g., the RIS communication component 198, the cellular baseband processor 1424, and/or the transceiver(s) 1422 of the apparatus 1404 in FIG. 14.

At 1206, the UE may calculate, based on the beam pattern information, a direction for transmitting the set of UL beams, where the first transmission angle for the set of UL beams is adjusted to proximately align with the second transmission angle of the set of DL beams from the RIS based on the calculated direction, such as described in connection with FIGS. 9 to 10. For example, at 922 of FIG. 9, the UE 904 may calculate, based on the beam pattern information 908 and measurement for a set of RIS DL beams 910, a direction 912 for transmitting the set of UL beams 914. The calculation of the direction may be performed by, e.g., the RIS communication component 198, the cellular baseband processor 1424, and/or the transceiver(s) 1422 of the apparatus 1404 in FIG. 14. In such an example, the beam pattern information includes: a first beam pattern of a PRS, a second beam pattern of an SSB, a third beam pattern of a CSI-RS, or a combination thereof. In another example, the direction for transmitting the set of UL beams is calculated based on calculating an RSRP for the set of DL beams or using an Rx digital beamforming-based method to calculate the direction.

At 1208, the UE may indicate a method of calculating the direction for transmitting the set of UL beams to the network entity, where the method of calculating the direction is based on a capability of the UE, such as described in connection with FIGS. 9 to 10. For example, at 928 of FIG. 9, the UE 904 may transmit an indication of method of calculating the direction 912 to the base station 902. The indication of method of calculating the direction may be performed by, e.g., the RIS communication component 198, the cellular baseband processor 1424, and/or the transceiver(s) 1422 of the apparatus 1404 in FIG. 14.

In another example, at 1210, the UE may measure an RSRP for each of the set of DL beams from the RIS, and transmit a report of the RSRP measurement for each of the set of DL beams to the network entity, such as described in connection with FIGS. 9 to 10. For example, at 1020 of FIG. 10, the UE 1004 may measure RSRP for a set of RIS DL beams 1010. The measurement of RSRP may be performed by, e.g., the RIS communication component 198, the cellular baseband processor 1424, and/or the transceiver(s) 1422 of the apparatus 1404 in FIG. 14.

At 1212, the UE may receive, from the network entity, second information indicative of a difference between an angle of the set of DL beams from the RIS and an AoD of the UE, such as described in connection with FIGS. 9 to 10. For example, at 1020 of FIG. 10, the UE 1004 may receive, from the base station 1002, an angle difference 1012 indication indicating a difference between an angle of the set of RIS DL beams 1010 and an AoD of the UE 1004. The reception of second information may be performed by, e.g., the RIS communication component 198, the cellular baseband processor 1424, and/or the transceiver(s) 1422 of the apparatus 1404 in FIG. 14. In such an example, the first transmission angle for the set of UL beams is adjusted to proximately align with the second transmission angle of the set of DL beams from the RIS based on the difference.

At 1214, the UE may adjust a first transmission angle for a set of UL beams based on the beam pattern information and measurement for the set of DL beams, where the first transmission angle for the set of UL beams is adjusted to proximately align with a second transmission angle of the set of DL beams from the RIS, such as described in connection with FIGS. 9 to 10. For example, at 924 of FIG. 9, the UE 904 may adjust a Tx angle for a set of UL beams 914 based on the beam pattern information 908 (e.g., Tx angle for the set of UL beams 914 is adjusted to proximately align with a transmission angle of the set of RIS DL beams 910 based on the calculated direction 912). The adjustment of transmission angle may be performed by, e.g., the RIS communication component 198, the cellular baseband processor 1424, and/or the transceiver(s) 1422 of the apparatus 1404 in FIG. 14.

At 1216, the UE may transmit, via the RIS, the set of UL beams to the network entity based on the adjusted first transmission angle, such as described in connection with FIGS. 9 to 10. For example, at 926 of FIG. 9, the UE 904 may transmit signals via the set of UL beams 914 at the adjusted Tx angle. The reception of indication of beam pattern information may be performed by, e.g., the RIS communication component 198, the cellular baseband processor 1424, and/or the transceiver(s) 1422 of the apparatus 1404 in FIG. 14.

Figure 13:
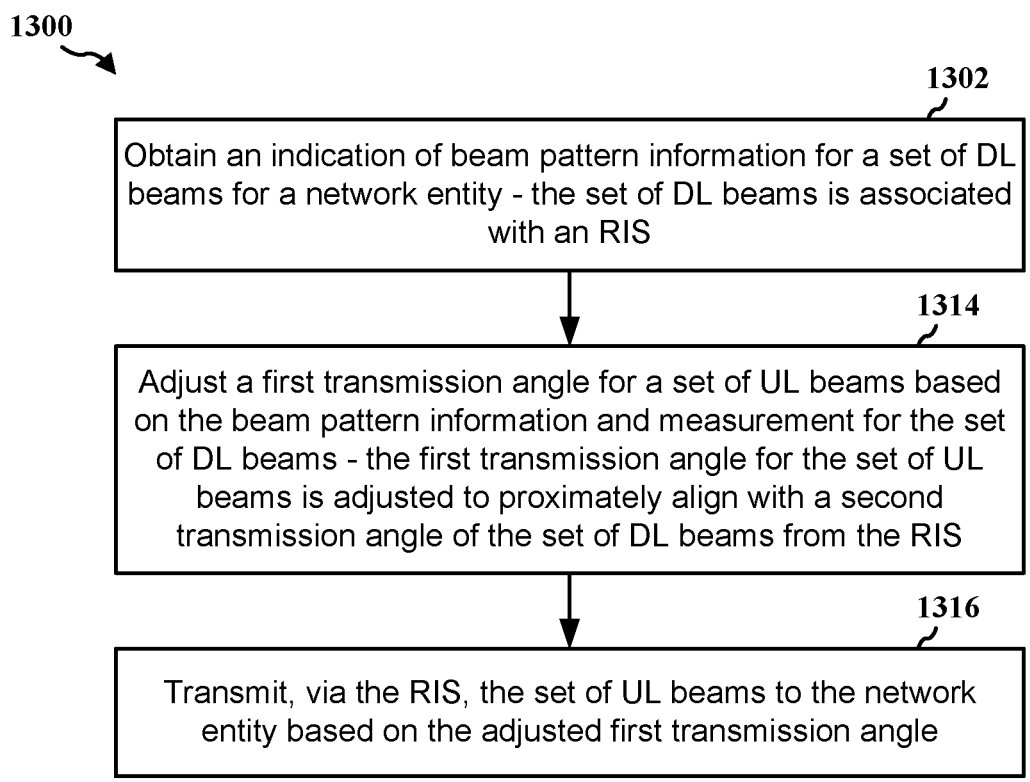
FIG. 13 is a flowchart of a method of wireless communication.

FIG. 13 is a flowchart 1300 of a method of wireless communication. The method may be performed by a UE (e.g., the UE 104, 404, 804, 904, 1004, 1104; the apparatus 1404). The method may enable the UE to maintain beam correspondence with a base station via an RIS that has a limited number of control voltage sets (e.g., with one pair of control voltage set).

At 1302, the UE may obtain an indication of beam pattern information for a set of DL beams for a network entity, where the set of DL beams is associated with an RIS, such as described in connection with FIGS. 9 to 10. For example, at 920 of FIG. 9, the UE 904 may receive beam pattern information 908 from the base station 902 associated with a set of RIS DL beams. The reception of indication of beam pattern information may be performed by, e.g., the RIS communication component 198, the cellular baseband processor 1424, and/or the transceiver(s) 1422 of the apparatus 1404 in FIG. 14.

At 1314, the UE may adjust a first transmission angle for a set of UL beams based on the beam pattern information and measurement for the set of DL beams, where the first transmission angle for the set of UL beams is adjusted to proximately align with a second transmission angle of the set of DL beams from the RIS, such as described in connection with FIGS. 9 to 10. For example, at 924 of FIG. 9, the UE 904 may adjust a Tx angle for a set of UL beams 914 based on the beam pattern information 908 (e.g., Tx angle for the set of UL beams 914 is adjusted to proximately align with a transmission angle of the set of RIS DL beams 910 based on the calculated direction 912). The adjustment of transmission angle may be performed by, e.g., the RIS communication component 198, the cellular baseband processor 1424, and/or the transceiver(s) 1422 of the apparatus 1404 in FIG. 14.

At 1316, the UE may transmit, via the RIS, the set of UL beams to the network entity based on the adjusted first transmission angle, such as described in connection with FIGS. 9 to 10. For example, at 926 of FIG. 9, the UE 904 may transmit signals via the set of UL beams 914 at the adjusted Tx angle. The reception of indication of beam pattern information may be performed by, e.g., the RIS communication component 198, the cellular baseband processor 1424, and/or the transceiver(s) 1422 of the apparatus 1404 in FIG. 14.

In one example, to obtain the indication of the beam pattern information, the UE may receive, from the network entity via the RIS, the indication of the beam pattern information for the set of DL beams associated with the RIS, such as described in connection with FIGS. 9 to 10. For example, at 920 of FIG. 9, the UE 904 may receive beam pattern information 908 from the base station 902 associated with a set of RIS DL beams. The reception of indication of beam pattern information may be performed by, e.g., the RIS communication component 198, the cellular baseband processor 1424, and/or the transceiver(s) 1422 of the apparatus 1404 in FIG. 14.

In another example, the UE may calculate, based on the beam pattern information, a direction for transmitting the set of UL beams, where the first transmission angle for the set of UL beams is adjusted to proximately align with the second transmission angle of the set of DL beams from the RIS based on the calculated direction, such as described in connection with FIGS. 9 to 10. For example, at 922 of FIG. 9, the UE 904 may calculate, based on the beam pattern information 908 and measurement for a set of RIS DL beams 910, a direction 912 for transmitting the set of UL beams 914. The calculation of the direction may be performed by, e.g., the RIS communication component 198, the cellular baseband processor 1424, and/or the transceiver(s) 1422 of the apparatus 1404 in FIG. 14. In such an example, the beam pattern information includes: a first beam pattern of a PRS, a second beam pattern of an SSB, a third beam pattern of a CSI-RS, or a combination thereof. In another example, the direction for transmitting the set of UL beams is calculated based on calculating an RSRP for the set of DL beams or using an Rx digital beamforming-based method to calculate the direction.

In another example, the UE may indicate a method of calculating the direction for transmitting the set of UL beams to the network entity, where the method of calculating the direction is based on a capability of the UE, such as described in connection with FIGS. 9 to 10. For example, at 928 of FIG. 9, the UE 904 may transmit an indication of method of calculating the direction 912 to the base station 902. The indication of method of calculating the direction may be performed by, e.g., the RIS communication component 198, the cellular baseband processor 1424, and/or the transceiver(s) 1422 of the apparatus 1404 in FIG. 14.

In another example, the UE may measure an RSRP for each of the set of DL beams from the RIS, and transmit a report of the RSRP measurement for each of the set of DL beams to the network entity, such as described in connection with FIGS. 9 to 10. For example, at 1020 of FIG. 10, the UE 1004 may measure RSRP for a set of RIS DL beams 1010. The measurement of RSRP may be performed by, e.g., the RIS communication component 198, the cellular baseband processor 1424, and/or the transceiver(s) 1422 of the apparatus 1404 in FIG. 14.

In another example, the UE may receive, from the network entity, second information indicative of a difference between an angle of the set of DL beams from the RIS and an AoD of the UE, such as described in connection with FIGS. 9 to 10. For example, at 1020 of FIG. 10, the UE 1004 may receive, from the base station 1002, an angle difference 1012 indication indicating a difference between an angle of the set of RIS DL beams 1010 and an AoD of the UE 1004. The reception of second information may be performed by, e.g., the RIS communication component 198, the cellular baseband processor 1424, and/or the transceiver(s) 1422 of the apparatus 1404 in FIG. 14. In such an example, the first transmission angle for the set of UL beams is adjusted to proximately align with the second transmission angle of the set of DL beams from the RIS based on the difference.

Figure 14:
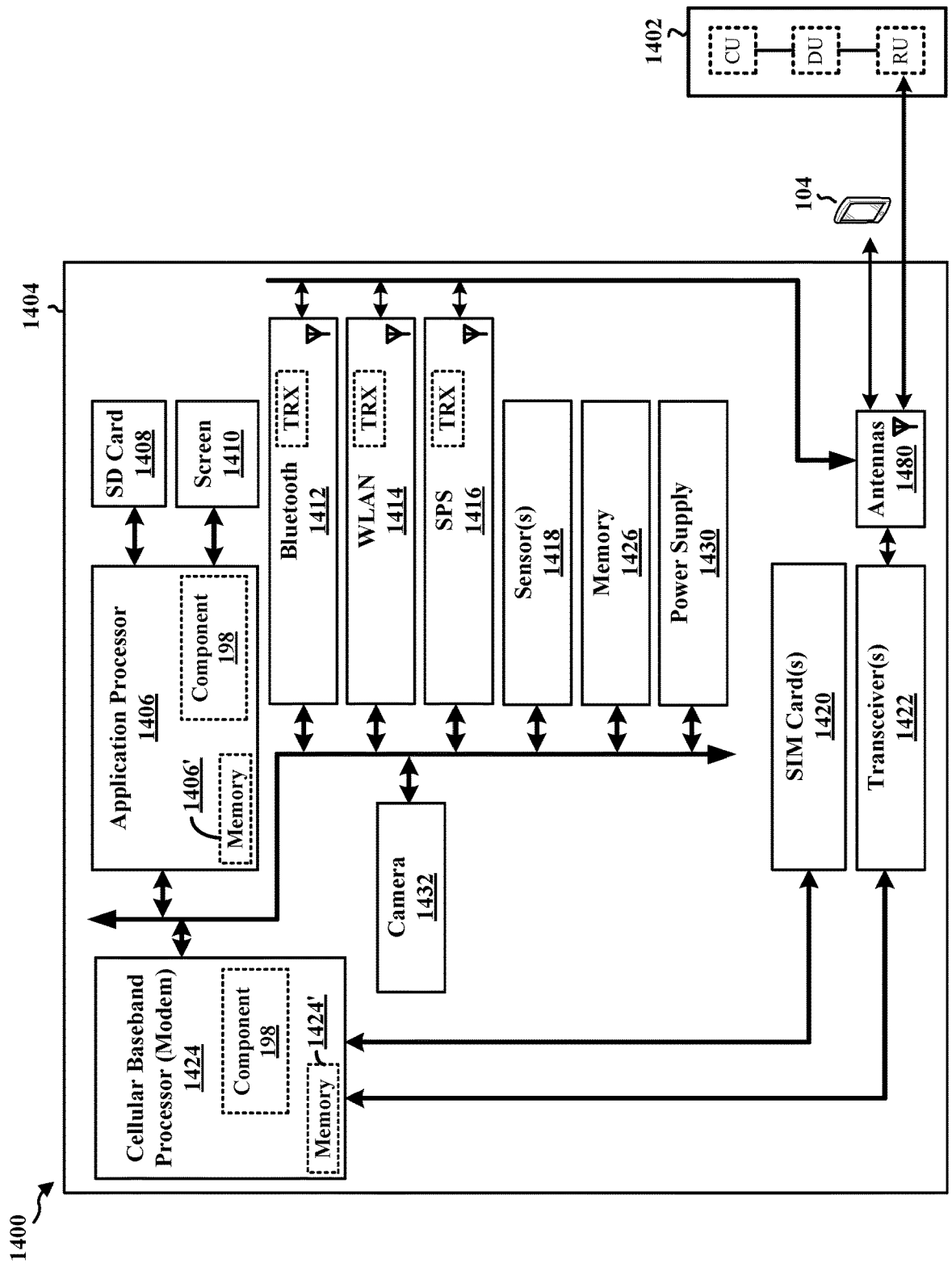
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial management unit (IMU), gyroscope, and/or accelerometer(s), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the RIS communication component 198 may be configured to obtain an indication of beam pattern information for a set of DL beams for a network entity, where the set of DL beams is associated with an RIS. The RIS communication component 198 may also be configured to adjust a first transmission angle for a set of UL beams based on the beam pattern information and measurement for the set of DL beams, where the first transmission angle for the set of UL beams is adjusted to proximately align with a second transmission angle of the set of DL beams from the RIS. The RIS communication component 198 may also be configured to transmit, via the RIS, the set of UL beams to the network entity based on the adjusted first transmission angle. The RIS communication component 198 may be within the cellular baseband processor 1424, the application processor 1406, or both the cellular baseband processor 1424 and the application processor 1406. The RIS communication component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for obtaining an indication of beam pattern information for a set of DL beams for a network entity, where the set of DL beams is associated with an RIS. The apparatus 1404 may further include means for adjusting a first transmission angle for a set of UL beams based on the beam pattern information and measurement for the set of DL beams, where the first transmission angle for the set of UL beams is adjusted to proximately align with a second transmission angle of the set of DL beams from the RIS. The apparatus 1404 may further include means for transmitting, via the RIS, the set of UL beams to the network entity based on the adjusted first transmission angle.

In one configuration, to obtain the indication of the beam pattern information the apparatus 1404 is configured to receive, from the network entity via the RIS, the indication of the beam pattern information for the set of DL beams associated with the RIS.

In another configuration, the apparatus 1404 may further include means for calculating, based on the beam pattern information, a direction for transmitting the set of UL beams, and where the first transmission angle for the set of UL beams is adjusted to proximately align with the second transmission angle of the set of DL beams from the RIS based on the calculated direction. In such a configuration, the beam pattern information includes: a first beam pattern of a PRS, a second beam pattern of an SSB, a third beam pattern of a CSI-RS, or a combination thereof. In another configuration, the direction for transmitting the set of UL beams is calculated based on calculating an RSRP for the set of DL beams or using an Rx digital beamforming-based method to calculate the direction.

In another configuration, the apparatus 1404 may further include means for indicating a method of calculating the direction for transmitting the set of UL beams to the network entity, where the method of calculating the direction is based on a capability of the UE.

In another configuration, to obtain the indication of the beam pattern information the apparatus 1404 is configured to receive, from the network entity, second information indicative of a difference between an angle of the set of DL beams from the RIS and an AoD of the UE.

In another configuration, the first transmission angle for the set of UL beams is adjusted to proximately align with the second transmission angle of the set of DL beams from the RIS based on the difference.

In another configuration, the apparatus 1404 may further include means for measuring an RSRP for each of the set of DL beams from the RIS, and means for transmitting a report of the RSRP measurement for each of the set of DL beams to the network entity.

The means may be the RIS communication component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
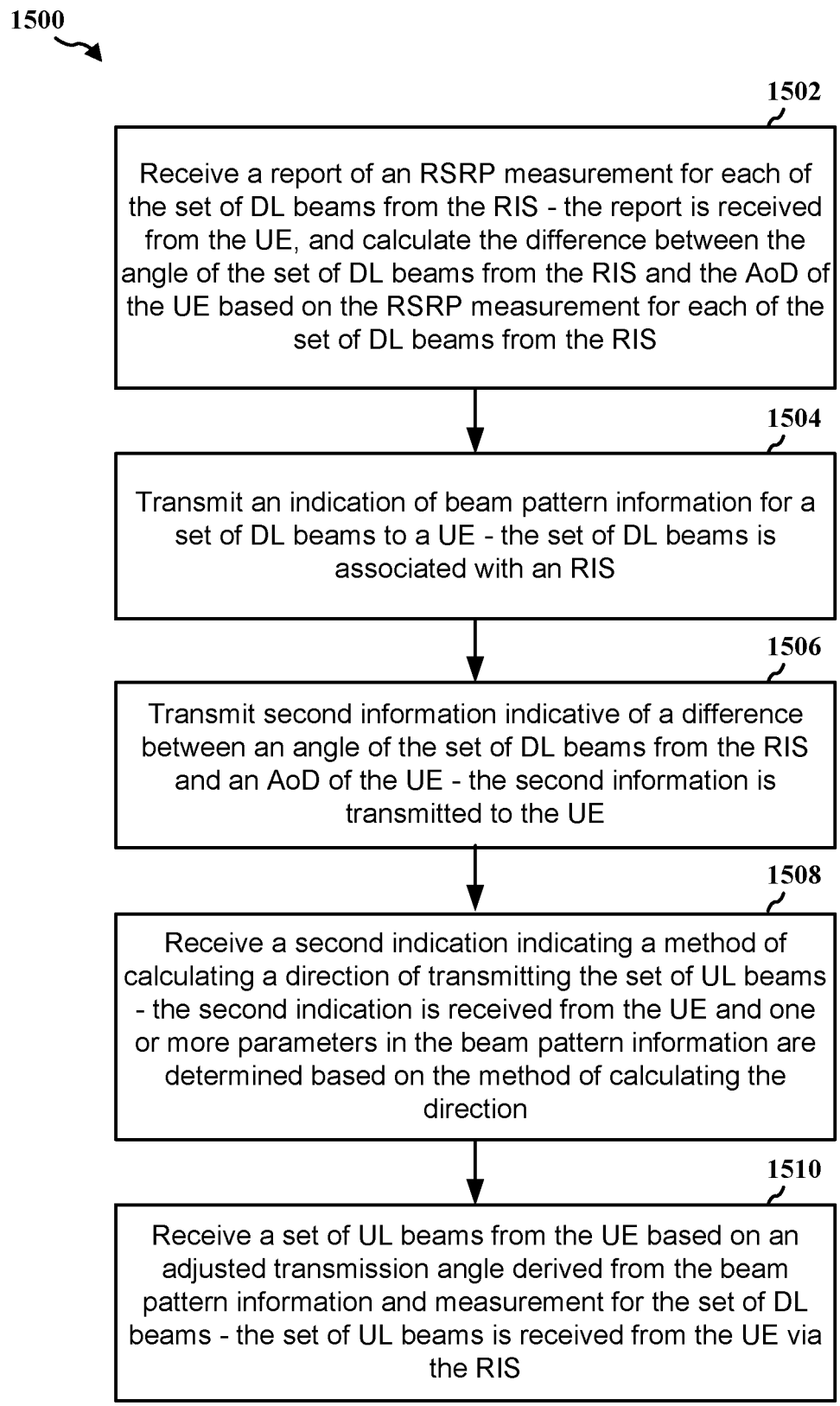
FIG. 15 is a flowchart of a method of wireless communication.

FIG. 15 is a flowchart 1500 of a method of wireless communication. The method may be performed by a base station (e.g., the base station 102, 902, 1002, 1102; the network entity 1702). The method may enable the base station to maintain beam correspondence with a UE via an RIS that has a limited number of control voltage sets (e.g., with one pair of control voltage set).

At 1502, the base station may receive a report of an RSRP measurement for each of the set of DL beams from the RIS, where the report is received from the UE, and the base station may calculate the difference between the angle of the set of DL beams from the RIS and the AoD of the UE based on the RSRP measurement for each of the set of DL beams from the RIS, such as described in connection with FIG. 10. For example, at 1022 and 1024 of FIG. 10, the base station 1002 may receive RSRP measurement report for the set of RIS DL beams 1010 from the UE 1004, and the base station 1002 may derive an angle difference 1012 between the RIS DL beams 1010 and AoD of the UE 1004 based on the RSRP measurements. The reception of the RSRP measurement and/or the calculation of differences between the angles may be performed by, e.g., the RIS communication component 199 and/or the transceiver(s) 1746 of the network entity 1702 in FIG. 17.

At 1504, the base station may transmit an indication of beam pattern information for a set of DL beams to a UE, where the set of DL beams is associated with an RIS, such as described in connection with FIGS. 9 and 10. For example, at 908 of FIG. 9, the base station 1002 may transmit beam pattern information 908 for a set of RIS DL beams to the UE 904. The transmission of the indication of beam pattern information may be performed by, e.g., the RIS communication component 199 and/or the transceiver(s) 1746 of the network entity 1702 in FIG. 17. In one example, the beam pattern information includes: a first beam pattern of a PRS, a second beam pattern of an SSB, a third beam pattern of a CSI-RS, or a combination thereof.

At 1506, the base station may transmit second information indicative of a difference between an angle of the set of DL beams from the RIS and an AoD of the UE, where the second information is transmitted to the UE, such as described in connection with FIGS. 9 and 10. For example, at 1012 of FIG. 10, the base station 1002 may transmit, to the UE 1004, angle difference 1012 between the RIS DL beams 1010 and AoD of the UE 1004. The transmission of the information indicative of a difference between angles may be performed by, e.g., the RIS communication component 199 and/or the transceiver(s) 1746 of the network entity 1702 in FIG. 17.

At 1508, the base station may receive a second indication indicating a method of calculating a direction of transmitting the set of UL beams, where the second indication is received from the UE, wherein one or more parameters in the beam pattern information are determined based on the method of calculating the direction, such as described in connection with FIG. 9. For example, at 928 of FIG. 9, the base station 902 may receive an indication of method of calculating the direction 912 from the UE 904. The reception of the second indication indicating a method of calculating the direction may be performed by, e.g., the RIS communication component 199 and/or the transceiver(s) 1746 of the network entity 1702 in FIG. 17.

At 1510, the base station may receive a set of UL beams from the UE based on an adjusted transmission angle derived from the beam pattern information and measurement for the set of DL beams, where the set of UL beams is received from the UE via the RIS, such as described in connection with FIGS. 9 and 10. For example, at 926 of FIG. 9, the base station 1002 may receive signals from the UE 904 via the set of UL beams 914 at the adjusted Tx angle. The reception of the set of UL beams may be performed by, e.g., the RIS communication component 199 and/or the transceiver(s) 1746 of the network entity 1702 in FIG. 17.

Figure 16:
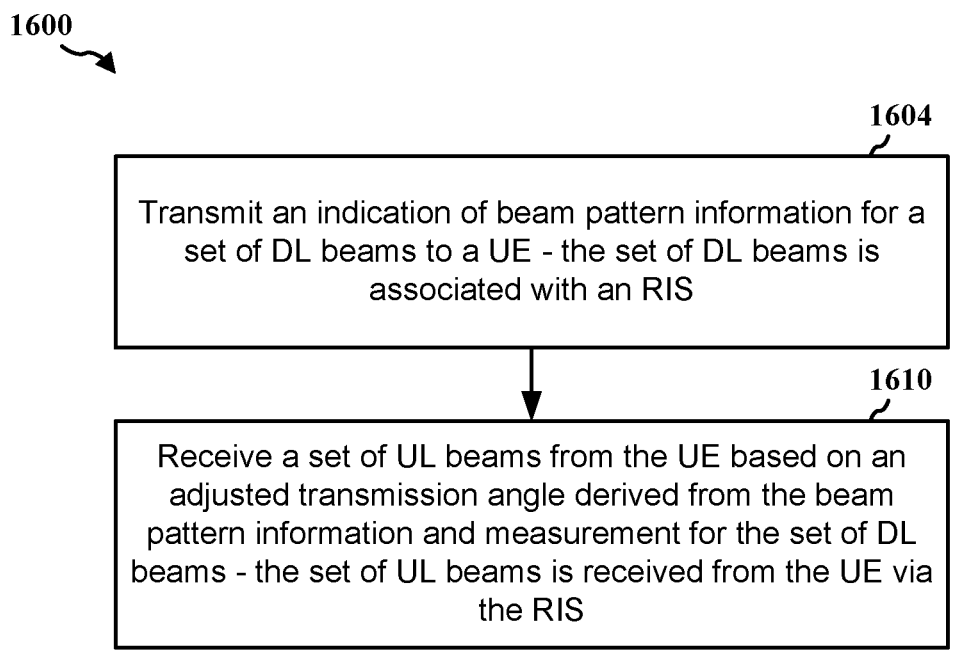
FIG. 16 is a flowchart of a method of wireless communication.

FIG. 16 is a flowchart 1600 of a method of wireless communication. The method may be performed by a base station (e.g., the base station 102, 902, 1002, 1102; the network entity 1702). The method may enable the base station to maintain beam correspondence with a UE via an RIS that has a limited number of control voltage sets (e.g., with one pair of control voltage set).

At 1604, the base station may transmit an indication of beam pattern information for a set of DL beams to a UE, where the set of DL beams is associated with an RIS, such as described in connection with FIGS. 9 and 10. For example, at 908 of FIG. 9, the base station 1002 may transmit beam pattern information 908 for a set of RIS DL beams to the UE 904. The transmission of the indication of beam pattern information may be performed by, e.g., the RIS communication component 199 and/or the transceiver(s) 1746 of the network entity 1702 in FIG. 17. In one example, the beam pattern information includes: a first beam pattern of a PRS, a second beam pattern of an SSB, a third beam pattern of a CSI-RS, or a combination thereof.

At 1610, the base station may receive a set of UL beams from the UE based on an adjusted transmission angle derived from the beam pattern information and measurement for the set of DL beams, where the set of UL beams is received from the UE via the RIS, such as described in connection with FIGS. 9 and 10. For example, at 926 of FIG. 9, the base station 1002 may receive signals from the UE 904 via the set of UL beams 914 at the adjusted Tx angle. The reception of the set of UL beams may be performed by, e.g., the RIS communication component 199 and/or the transceiver(s) 1746 of the network entity 1702 in FIG. 17.

In one example, the base station may receive a report of an RSRP measurement for each of the set of DL beams from the RIS, where the report is received from the UE, and the base station may calculate the difference between the angle of the set of DL beams from the RIS and the AoD of the UE based on the RSRP measurement for each of the set of DL beams from the RIS, such as described in connection with FIG. 10. For example, at 1022 and 1024 of FIG. 10, the base station 1002 may receive RSRP measurement report for the set of RIS DL beams 1010 from the UE 1004, and the base station 1002 may derive an angle difference 1012 between the RIS DL beams 1010 and AoD of the UE 1004 based on the RSRP measurements. The reception of the RSRP measurement and/or the calculation of differences between the angles may be performed by, e.g., the RIS communication component 199 and/or the transceiver(s) 1746 of the network entity 1702 in FIG. 17.

In another example, the base station may transmit second information indicative of a difference between an angle of the set of DL beams from the RIS and an AoD of the UE, where the second information is transmitted to the UE, such as described in connection with FIGS. 9 and 10. For example, at 1012 of FIG. 10, the base station 1002 may transmit, to the UE 1004, angle difference 1012 between the RIS DL beams 1010 and AoD of the UE 1004. The transmission of the information indicative of a difference between angles may be performed by, e.g., the RIS communication component 199 and/or the transceiver(s) 1746 of the network entity 1702 in FIG. 17.

In another example, the base station may receive a second indication indicating a method of calculating a direction of transmitting the set of UL beams, where the second indication is received from the UE, wherein one or more parameters in the beam pattern information are determined based on the method of calculating the direction, such as described in connection with FIG. 9. For example, at 928 of FIG. 9, the base station 902 may receive an indication of method of calculating the direction 912 from the UE 904. The reception of the second indication indicating a method of calculating the direction may be performed by, e.g., the RIS communication component 199 and/or the transceiver(s) 1746 of the network entity 1702 in FIG. 17.

Figure 17:
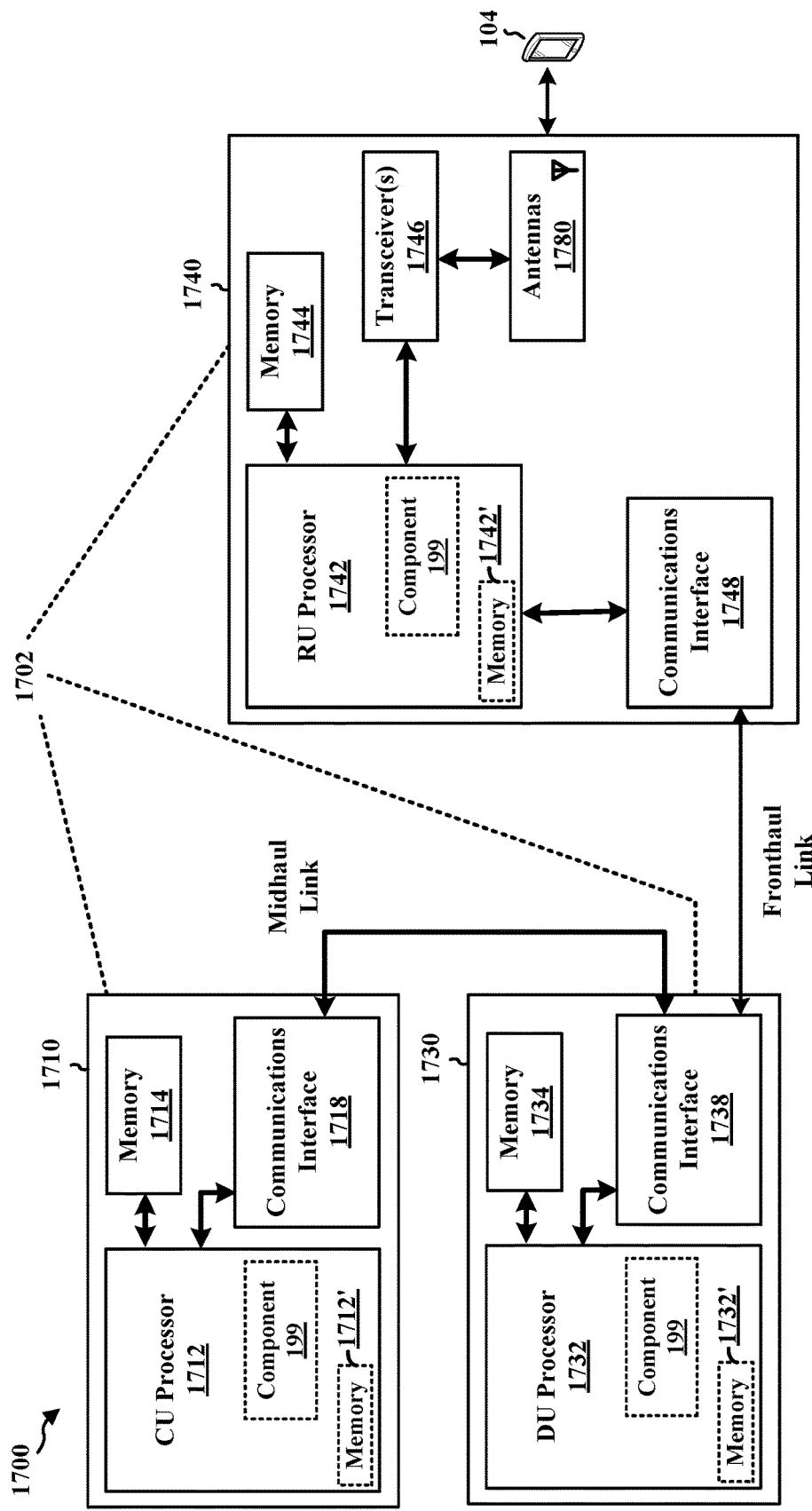
FIG. 17 is a diagram illustrating an example of a hardware implementation for an example apparatus and/or network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the RIS communication component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the RIS communication component 199 may be configured to transmit an indication of beam pattern information for a set of DL beams to a UE, where the set of DL beams is associated with an RIS. The RIS communication component 199 may also be configured to receive a set of UL beams from the UE based on an adjusted transmission angle derived from the beam pattern information and measurement for the set of DL beams, where the set of UL beams is received from the UE via the RIS. The RIS communication component 199 may be within one or more processors of one or more of the CU 1710, DU 1730, and the RU 1740. The RIS communication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for transmitting an indication of beam pattern information for a set of DL beams to a UE, where the set of DL beams is associated with an RIS. The network entity 1702 may further include means for receiving a set of UL beams from the UE based on an adjusted transmission angle derived from the beam pattern information and measurement for the set of DL beams, where the set of UL beams is received from the UE via the RIS.

In one configuration, the beam pattern information includes: a first beam pattern of a PRS, a second beam pattern of an SSB, a third beam pattern of a CSI-RS, or a combination thereof.

In another configuration, the network entity 1702 may further include means for receiving a second indication indicating a method of calculating a direction of transmitting the set of UL beams, wherein the second indication is received from the UE, wherein one or more parameters in the beam pattern information are determined based on the method of calculating the direction.

In another configuration, the means for transmitting the indication of the beam pattern information further includes configuring the network entity 1702 to transmit second information indicative of a difference between an angle of the set of DL beams from the RIS and an AoD of the UE, where the second information is transmitted to the UE.

In another configuration, the network entity 1702 may further include means for receiving a report of an RSRP measurement for each of the set of DL beams from the RIS, where the report is received from the UE, and means for calculating the difference between the angle of the set of DL beams from the RIS and the AoD of the UE based on the RSRP measurement for each of the set of DL beams from the RIS.

The means may be the RIS communication component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

Figure 18:
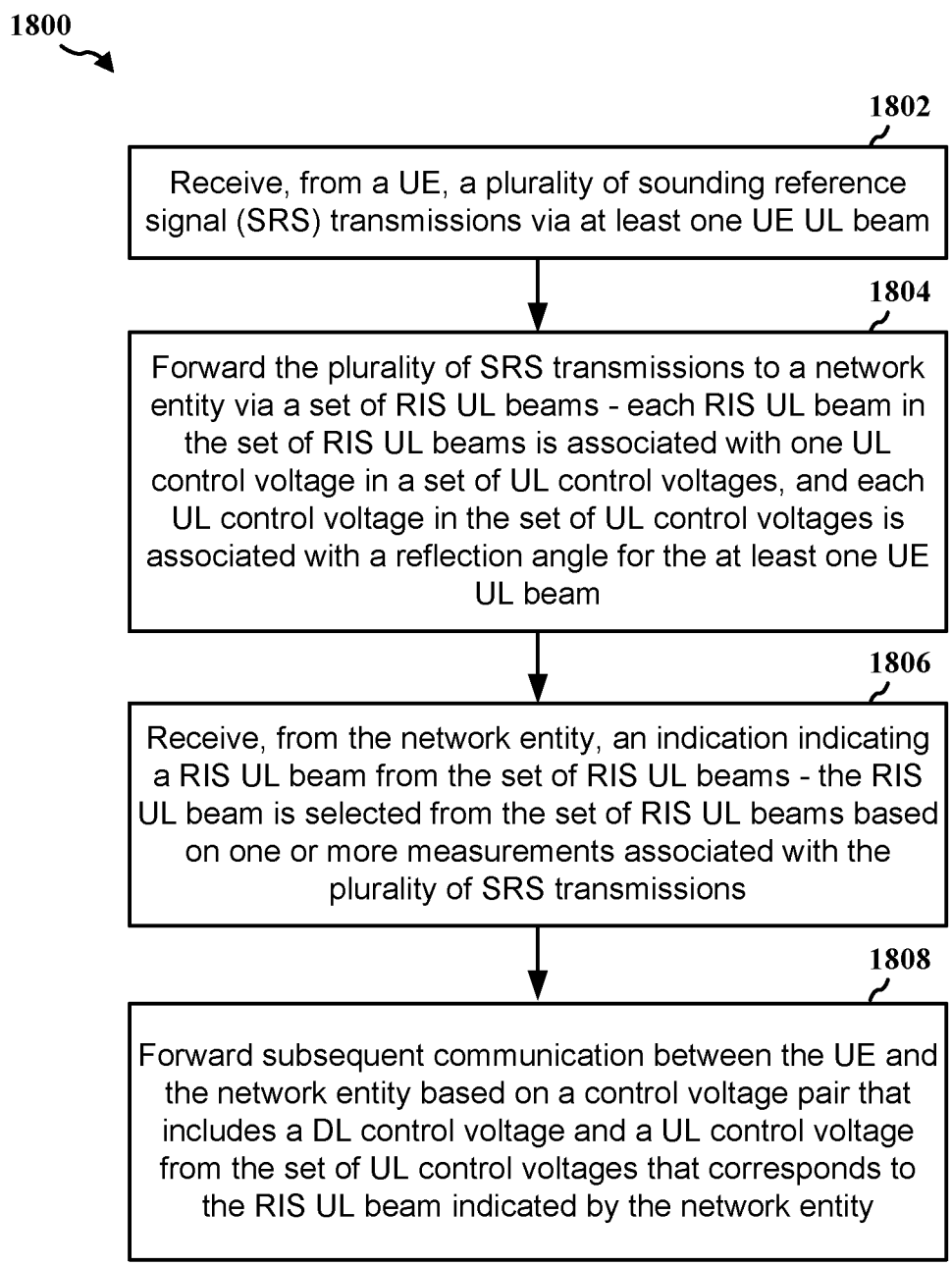
FIG. 18 is a flowchart of a method of wireless communication.

FIG. 18 is a flowchart 1800 of a method of wireless communication. The method may be performed by an RIS (e.g., the RIS 103, 906, 1006, 1106; the apparatus 1904). The method may enable the RIS to maintain beam correspondence between a base station and a UE using a limited number of control voltage sets.

At 1802, the RIS may receive, from a UE, a plurality of SRS transmissions via at least one UE UL beam, such as described in connection with FIG. 11. For example, at 1128 of FIG. 11, the RIS 1106 may receive SRS transmissions from the UE 1104. The reception of the SRS transmissions may be performed by, e.g., the RIS communication component 197, the cellular baseband processor 1924, and/or the transceiver(s) 1922 of the apparatus 1904 in FIG. 19.

At 1804, the RIS may forward the plurality of SRS transmissions to a network entity via a set of RIS UL beams, where each RIS UL beam in the set of RIS UL beams is associated with one UL control voltage in a set of UL control voltages, and each UL control voltage in the set of UL control voltages is associated with a reflection angle for the at least one UE UL beam, such as described in connection with FIG. 11. For example, at 1130 of FIG. 11, the RIS 1106 may forward the plurality of SRS transmissions to the base station 1102 via a set of RIS UL beams. The forwarding of the SRS transmissions may be performed by, e.g., the RIS communication component 197, the cellular baseband processor 1924, and/or the transceiver(s) 1922 of the apparatus 1904 in FIG. 19.

At 1806, the RIS may receive, from the network entity, an indication indicating a RIS UL beam from the set of RIS UL beams, where the RIS UL beam is selected from the set of RIS UL beams based on one or more measurements associated with the plurality of SRS transmissions, such as described in connection with FIG. 11. For example, at 1132 of FIG. 11, the RIS 1106 may receive an RIS UL beam indication from the base station 1102. The reception of the indication may be performed by, e.g., the RIS communication component 197, the cellular baseband processor 1924, and/or the transceiver(s) 1922 of the apparatus 1904 in FIG. 19.

At 1808, the RIS may forward subsequent communication between the UE and the network entity based on a control voltage pair that includes a DL control voltage and a UL control voltage from the set of UL control voltages that corresponds to the RIS UL beam indicated by the network entity, such as described in connection with FIG. 11. For example, at 1134 of FIG. 11, the RIS 1106 may forward subsequent transmissions between the base station 1102 and the UE 1104 based on updated control voltage pair. The forward of the communication may be performed by, e.g., the RIS communication component 197, the cellular baseband processor 1924, and/or the transceiver(s) 1922 of the apparatus 1904 in FIG. 19.

In one example, the RIS may receive a plurality of DL RS transmissions from the network entity, and the RIS may forward the plurality of DL RS transmissions to the UE using the DL control voltage, and where the at least one UE UL beam is determined based on a set of measurements associated with the plurality of DL RS transmissions. In such an example, the set of measurements associated with the plurality of DL RS transmissions includes an RSRP or an SINR of the DL RS transmissions.

In another example, the RIS UL beam indicated by the network entity is a beam with a best beam measurement or a most suitable beam measurement from the set of RIS UL beams.

Figure 19:
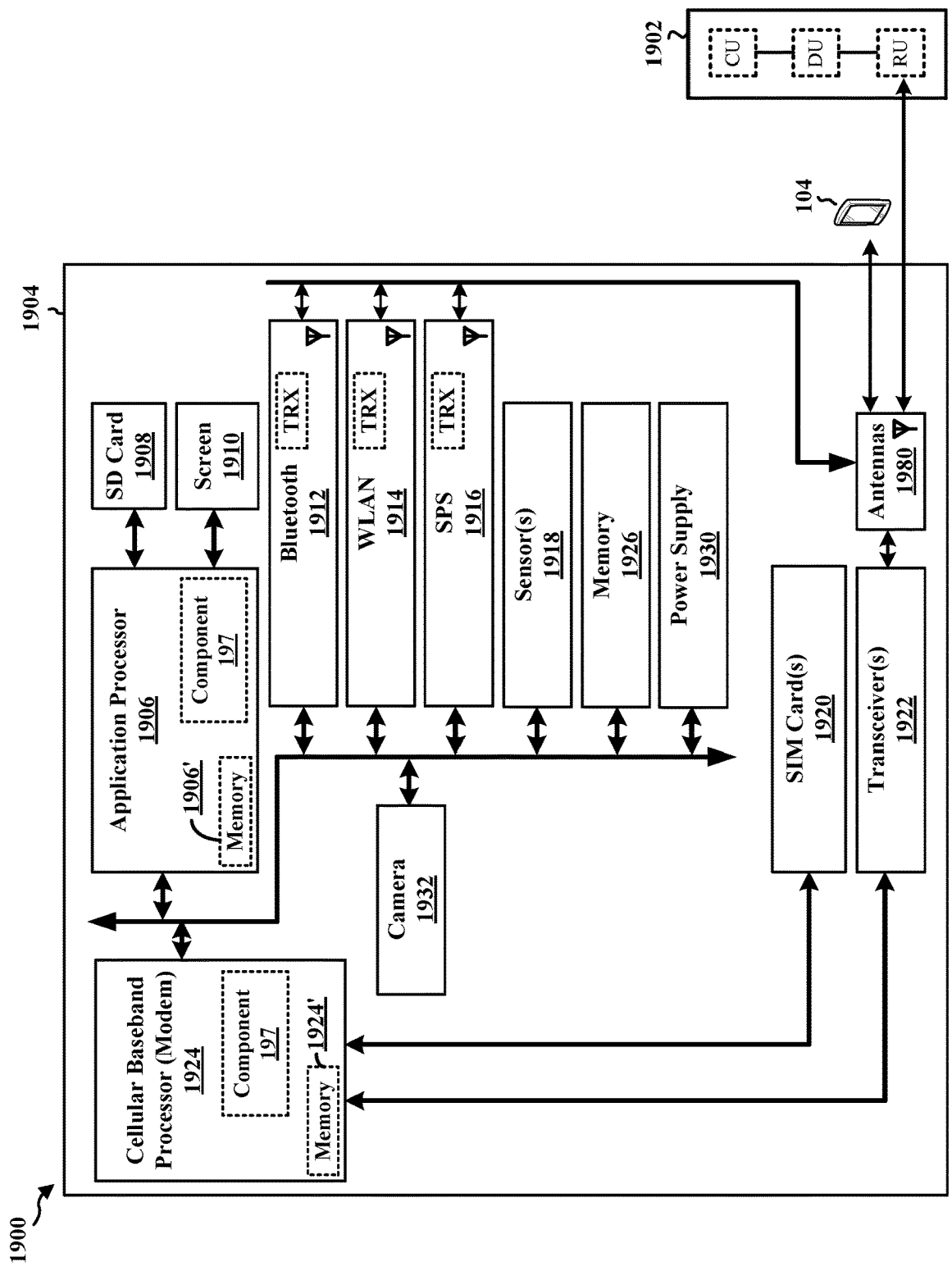
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be an RIS, a component of an RIS, or may implement RIS functionality. In some aspects, the apparatus 1904 may include a cellular baseband processor 1924 (also referred to as a modem) coupled to one or more transceivers 1922 (e.g., cellular RF transceiver). The cellular baseband processor 1924 may include on-chip memory 1924'. In some aspects, the apparatus 1904 may further include one or more subscriber identity modules (SIM) cards 1920 and an application processor 1906 coupled to a secure digital (SD) card 1908 and a screen 1910. The application processor 1906 may include on-chip memory 1906'. In some aspects, the apparatus 1904 may further include a Bluetooth module 1912, a WLAN module 1914, an SPS module 1916 (e.g., GNSS module), one or more sensor modules 1918 (e.g., barometric pressure sensor/altimeter; motion sensor such as inertial management unit (IMU), gyroscope, and/or accelerometer(s), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor 1924 communicates through the transceiver(s) 1922 via one or more antennas 1980 with the UE 104 and/or with an RU associated with a network entity 1902. The cellular baseband processor 1924 and the application processor 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor 1924 and the application processor 1906 are each responsible for general processing, including the execution of software stored on the computer-readable medium/memory. The software, when executed by the cellular baseband processor 1924/application processor 1906, causes the cellular baseband processor 1924/application processor 1906 to perform the various functions described supra. The computer-readable medium/memory may also be used for storing data that is manipulated by the cellular baseband processor 1924/application processor 1906 when executing software. The cellular baseband processor 1924/application processor 1906 may be a component of the UE 350 and may include the memory 360 and/or at least one of the TX processor 368, the RX processor 356, and the controller/processor 359. In one configuration, the apparatus 1904 may be a processor chip (modem and/or application) and include just the cellular baseband processor 1924 and/or the application processor 1906, and in another configuration, the apparatus 1904 may be the entire UE (e.g., see 350 of FIG. 3) and include the additional modules of the apparatus 1904.

As discussed supra, the RIS communication component 197 may be configured to receive, from a UE, a plurality of SRS transmissions via at least one UE UL beam. The RIS communication component 197 may also be configured to forward the plurality of SRS transmissions to a network entity via a set of RIS UL beams, where each RIS UL beam in the set of RIS UL beams is associated with one UL control voltage in a set of UL control voltages, and where each UL control voltage in the set of UL control voltages is associated with a reflection angle for the at least one UE UL beam. The RIS communication component 197 may also be configured to receive, from the network entity, an indication indicating a RIS UL beam from the set of RIS UL beams, where the RIS UL beam is selected from the set of RIS UL beams based on one or more measurements associated with the plurality of SRS transmissions. The RIS communication component 197 may also be configured to forward subsequent communication between the UE and the network entity based on a control voltage pair that includes a DL control voltage and a UL control voltage from the set of UL control voltages that corresponds to the RIS UL beam indicated by the network entity. The RIS communication component 197 may be within the cellular baseband processor 1924, the application processor 1906, or both the cellular baseband processor 1924 and the application processor 1906. The RIS communication component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1904 may include a variety of components configured for various functions. In one configuration, the apparatus 1904, and in particular the cellular baseband processor 1924 and/or the application processor 1906, may include means for receiving, from a UE, a plurality of SRS transmissions via at least one UE UL beam. The apparatus 1904 may further include means for forwarding the plurality of SRS transmissions to a network entity via a set of RIS UL beams, where each RIS UL beam in the set of RIS UL beams is associated with one UL control voltage in a set of UL control voltages, and where each UL control voltage in the set of UL control voltages is associated with a reflection angle for the at least one UE UL beam. The apparatus 1904 may further include means for receiving, from the network entity, an indication indicating a RIS UL beam from the set of RIS UL beams, where the RIS UL beam is selected from the set of RIS UL beams based on one or more measurements associated with the plurality of SRS transmissions. The apparatus 1904 may further include means for forwarding subsequent communication between the UE and the network entity based on a control voltage pair that includes a DL control voltage and a UL control voltage from the set of UL control voltages that corresponds to the RIS UL beam indicated by the network entity.

In one configuration, the RIS may receive a plurality of DL RS transmissions from the network entity, and the RIS may forward the plurality of DL RS transmissions to the UE using the DL control voltage, and where the at least one UE UL beam is determined based on a set of measurements associated with the plurality of DL RS transmissions. In such a configuration, the set of measurements associated with the plurality of DL RS transmissions includes an RSRP or an SINR of the DL RS transmissions.

In another configuration, the RIS UL beam indicated by the network entity is a beam with a best beam measurement or a most suitable beam measurement from the set of RIS UL beams.

The means may be the RIS communication component 197 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: obtaining an indication of beam pattern information for a set of DL beams for a network entity, where the set of DL beams is associated with an RIS; adjusting a first transmission angle for a set of UL beams based on the beam pattern information and measurement for the set of DL beams, wherein the first transmission angle for the set of UL beams is adjusted to proximately align with a second transmission angle of the set of DL beams from the RIS; and transmitting, via the RIS, the set of UL beams to the network entity based on the adjusted first transmission angle.

Aspect 2 is the method of aspect 1, further including: receiving, from the network entity via the RIS, the indication of the beam pattern information for the set of DL beams associated with the RIS.

Aspect 3 is the method of any of aspects 1 or 2, further including: calculating, based on the beam pattern information, a direction for transmitting the set of UL beams, and wherein the first transmission angle for the set of UL beams is adjusted to proximately align with the second transmission angle of the set of DL beams from the RIS based on the calculated direction.

Aspect 4 is the method of aspect 3, where the beam pattern information includes: a first beam pattern of a PRS, a second beam pattern of an SSB, a third beam pattern of a CSI-RS, or a combination thereof.

Aspect 5 is the method of aspect 3, where the direction for transmitting the set of UL beams is calculated based on calculating an RSRP for the set of DL beams or using an Rx digital beamforming-based method to calculate the direction.

Aspect 6 is the method of aspect 3, further including indicating a method of calculating the direction for transmitting the set of UL beams to the network entity, wherein the method of calculating the direction is based on a capability of the UE.

Aspect 7 is the method of any of aspects 1 to 6, further including receiving, from the network entity, second information indicative of a difference between an angle of the set of DL beams from the RIS and an AoD of the UE.

Aspect 8 is the method of aspect 7, where the first transmission angle for the set of UL beams is adjusted to proximately align with the second transmission angle of the set of DL beams from the RIS based on the difference.

Aspect 9 is the method of aspect 7, further including: measuring an RSRP for each of the set of DL beams from the RIS, and transmitting a report of the RSRP measurement for each of the set of DL beams to the network entity.

Aspect 10 is an apparatus for wireless communication at a UE, including: a memory; and at least one processor coupled to the memory and, based at least in part on information stored in the memory, the at least one processor is configured to implement any of aspects 1 to 9.

Aspect 11 is the apparatus of aspect 10, further including at least one of a transceiver or an antenna coupled to the at least one processor.

Aspect 12 is an apparatus for wireless communication including means for implementing any of aspects 1 to 9.

Aspect 13 is a computer-readable medium (e.g., a non-transitory computer-readable medium) storing computer executable code, where the code when executed by a processor causes the processor to implement any of aspects 1 to 9.

Aspect 14 is a method of wireless communication at a base station, including: transmitting an indication of beam pattern information for a set of DL beams to a UE, where the set of DL beams is associated with an RIS; and receiving a set of UL beams from the UE based on an adjusted transmission angle derived from the beam pattern information and measurement for the set of DL beams, where the set of UL beams is received from the UE via the RIS.

Aspect 15 is the method of aspect 14, where the beam pattern information includes: a first beam pattern of a PRS, a second beam pattern of an SSB, a third beam pattern of a CSI-RS, or a combination thereof.

Aspect 16 is the method of aspect 14 or 15, further including: receiving a second indication indicating a method of calculating a direction of transmitting the set of UL beams, wherein the second indication is received from the UE, wherein one or more parameters in the beam pattern information are determined based on the method of calculating the direction.

Aspect 17 is the method of any of aspects 14 to 16, further including: transmitting second information indicative of a difference between an angle of the set of DL beams from the RIS and an AoD of the UE, where the second information is transmitted to the UE.

Aspect 18 is the method of aspect 17, further including: receiving a report of an RSRP measurement for each of the set of DL beams from the RIS, where the report is received from the UE; and calculating the difference between the angle of the set of DL beams from the RIS and the AoD of the UE based on the RSRP measurement for each of the set of DL beams from the RIS.

Aspect 19 is an apparatus for wireless communication at a base station, including: a memory; and at least one processor coupled to the memory and, based at least in part on information stored in the memory, the at least one processor is configured to implement any of aspects 14 to 18.

Aspect 20 is the apparatus of aspect 19, further including at least one of a transceiver or an antenna coupled to the at least one processor.

Aspect 21 is an apparatus for wireless communication including means for implementing any of aspects 14 to 18.

Aspect 22 is a computer-readable medium (e.g., a non-transitory computer-readable medium) storing computer executable code, where the code when executed by a processor causes the processor to implement any of aspects 14 to 18.

Aspect 23 is a method of wireless communication at an RIS, including: receiving, from a UE, a plurality of SRS transmissions via at least one UE UL beam; forwarding the plurality of SRS transmissions to a network entity via a set of RIS UL beams, where each RIS UL beam in the set of RIS UL beams is associated with one UL control voltage in a set of UL control voltages, and where each UL control voltage in the set of UL control voltages is associated with a reflection angle for the at least one UE UL beam; receiving, from the network entity, an indication indicating a RIS UL beam from the set of RIS UL beams, where the RIS UL beam is selected from the set of RIS UL beams based on one or more measurements associated with the plurality of SRS transmissions; and forwarding subsequent communication between the UE and the network entity based on a control voltage pair that includes a DL control voltage and a UL control voltage from the set of UL control voltages that corresponds to the RIS UL beam indicated by the network entity.

Aspect 24 is the method of aspect 23, further including: receiving a plurality of DL RS transmissions from the network entity; and forwarding the plurality of DL RS transmissions to the UE using the DL control voltage, and where the at least one UE UL beam is determined based on a set of measurements associated with the plurality of DL RS transmissions.

Aspect 25 is the method of aspect 24, where the set of measurements associated with the plurality of DL RS transmissions includes an RSRP or an SINR of the DL RS transmissions.

Aspect 26 is the method of any of aspects 23 to 25, where the RIS UL beam indicated by the network entity is a beam with a best beam measurement or a most suitable beam measurement from the set of RIS UL beams.

Aspect 27 is an apparatus for wireless communication at an RIS, including: a memory; and at least one processor coupled to the memory and, based at least in part on information stored in the memory, the at least one processor is configured to implement any of aspects 23 to 26.

Aspect 28 is the apparatus of aspect 27, further including at least one of a transceiver or an antenna coupled to the at least one processor.

Aspect 29 is an apparatus for wireless communication including means for implementing any of aspects 23 to 26.

Aspect 30 is a computer-readable medium (e.g., a non-transitory computer-readable medium) storing computer executable code, where the code when executed by a processor causes the processor to implement any of aspects 23 to 26.

What is claimed is:

1. An apparatus for wireless communication at a user equipment (UE), comprising:
   a memory; and
   at least one processor coupled to the memory and, based at least in part on information stored in the memory, the at least one processor is configured to:
   obtain an indication of beam pattern information for a set of downlink (DL) beams for a network entity, wherein the set of DL beams is associated with a reconfigurable intelligent surface (RIS);
   adjust a first transmission angle for a set of uplink (UL) beams based on the beam pattern information and measurement for the set of DL beams, wherein the first transmission angle for the set of UL beams is adjusted to proximately align with a second transmission angle of the set of DL beams from the RIS;
   transmit, via the RIS, the set of UL beams to the network entity based on the adjusted first transmission angle;
   measure a reference signal received power (RSRP) for each of the set of DL beams from the RIS; and
   transmit a report of the RSRP measurement for each of the set of DL beams to the network entity, wherein to obtain the indication of the beam pattern information, the at least one processor is further configured to receive, from the network entity, a second information indicative of a difference between an angle of the set of DL beams from the RIS and an angle of
departure (AoD) of the UE.

2. The apparatus of claim 1, wherein to obtain the indication of the beam pattern information, the at least one processor is configured to:
receive, from the network entity via the RIS, the indication of the beam pattern information for the set of DL beams associated with the RIS.

3. The apparatus of claim 1, wherein the at least one processor is further configured to:
calculate, based on the beam pattern information, a direction for transmitting the set of UL beams, and wherein the first transmission angle for the set of UL beams is adjusted to proximately align with the second transmission angle of the set of DL beams from the RIS based on the calculated direction.

4. The apparatus of claim 3, wherein the beam pattern information includes:
a first beam pattern of a positioning reference signal (PRS),
a second beam pattern of a synchronization signal block (SSB),
a third beam pattern of a channel state information reference signal (CSI-RS), or
a combination thereof.

5. The apparatus of claim 3, wherein the direction for transmitting the set of UL beams is calculated based on calculating a reference signal received power (RSRP) for the set of DL beams or using a reception (Rx) digital beamforming-based method to calculate the direction.

6. The apparatus of claim 3, wherein the at least one processor is further configured to:
indicate a method of calculating the direction for transmitting the set of UL beams to the network entity, wherein the method of calculating the direction is based on a capability of the UE.

7. The apparatus of claim 1, wherein the first transmission angle for the set of UL beams is adjusted to proximately align with the second transmission angle of the set of DL beams from the RIS based on the difference.

8. The apparatus of claim 1, further comprising at least one of a transceiver or an antenna coupled to the at least one processor.

9. A method of wireless communication at a user equipment (UE), comprising:
obtaining an indication of beam pattern information for a set of downlink (DL) beams for a network entity, wherein the set of DL beams is associated with a reconfigurable intelligent surface (RIS);
adjusting a first transmission angle for a set of uplink (UL) beams based on the beam pattern information and measurement for the set of DL beams, wherein the first transmission angle for the set of UL beams is adjusted to proximately align with a second transmission angle of the set of DL beams from the RIS;
transmitting, via the RIS, the set of UL beams to the network entity based on the adjusted first transmission angle;
measuring a reference signal received power (RSRP) for each of the set of DL beams from the RIS, and transmitting a report of the RSRP measurement for each of the set of DL beams to the network entity; and
receiving, from the network entity, second information indicative of a difference between an angle of the set of DL beams from the RIS and an angle of departure (AoD) of the UE.

10. The method of claim 9, further comprising:
receiving, from the network entity via the RIS, the indication of the beam pattern information for the set of DL beams associated with the RIS.

11. The method of claim 9, further comprising:
calculating, based on the beam pattern information, a direction for transmitting the set of UL beams, and wherein the first transmission angle for the set of UL beams is adjusted to proximately align with the second transmission angle of the set of DL beams from the RIS based on the calculated direction.

12. The method of claim 11, wherein the beam pattern information includes:
a first beam pattern of a positioning reference signal (PRS),
a second beam pattern of a synchronization signal block (SSB),
a third beam pattern of a channel state information reference signal (CSI-RS), or
a combination thereof.

13. The method of claim 11, wherein the direction for transmitting the set of UL beams is calculated based on calculating a reference signal received power (RSRP) for the set of DL beams or using a reception (Rx) digital beamforming-based method to calculate the direction.

14. The method of claim 11, further comprising:
indicating a method of calculating the direction for transmitting the set of UL beams to the network entity, wherein the method of calculating the direction is based on a capability of the UE.

15. The method of claim 9, wherein the first transmission angle for the set of UL beams is adjusted to proximately align with the second transmission angle of the set of DL beams from the RIS based on the difference.

16. An apparatus for wireless communication at a network entity, comprising:
a memory; and
at least one processor coupled to the memory and, based at least in part on information stored in the memory, the at least one processor is configured to:
transmit an indication of beam pattern information for a set of downlink (DL) beams to a user equipment (UE), wherein the set of DL beams is associated with a reconfigurable intelligent surface (RIS);
receive a set of uplink (UL) beams from the UE based on an adjusted transmission angle derived from the beam pattern information and measurement for the set of DL beams, wherein the set of UL beams is received from the UE via the RIS, wherein to transmit the indication of the beam pattern information, the at least one processor is configured to:
transmit second information indicative of a difference between an angle of the set of DL beams from the RIS and an angle of departure (AoD) of the UE, wherein the second information is transmitted to the UE;
receive a report of a reference signal received power (RSRP) measurement for each of the set of DL beams from the RIS, wherein the report is received from the UE; and
calculate the difference between the angle of the set of DL beams from the RIS and the AoD of the UE based on the RSRP measurement for each of the set of DL beams from the RIS.

17. The apparatus of claim 16 wherein the beam pattern information includes:

a first beam pattern of a positioning reference signal (PRS), a second beam pattern of a synchronization signal block (SSB), a third beam pattern of a channel state information reference signal (CSI-RS), or a combination thereof.

18. The apparatus of claim 16, further comprising at least one of a transceiver or an antenna coupled to the at least one processor.

19. The apparatus of claim 16 wherein the at least one processor is further configured to: receive a second indication indicating a method of calculating a direction of transmitting the set of UL beams, wherein the second indication is received from the UE, wherein one or more parameters in the beam pattern information are determined based on the method of calculating the direction.

20. An apparatus for wireless communication at a reconfigurable intelligent surface (RIS), comprising:

a memory; and at least one processor coupled to the memory and, based at least in part on information stored in the memory, the at least one processor is configured to:

receive, from a user equipment (UE), a plurality of sounding reference signal (SRS) transmissions via at least one UE uplink (UL) beam;

forward the plurality of SRS transmissions to a network entity via a set of RIS UL beams, wherein each RIS UL beam in the set of RIS UL beams is associated with one UL control voltage in a set of UL control voltages, and wherein each UL control voltage in the set of UL control voltages is associated with a reflection angle for the at least one UE UL beam;

receive, from the network entity, an indication indicating a RIS UL beam from the set of RIS UL beams, wherein the RIS UL beam is selected from the set of RIS UL beams based on one or more measurements associated with the plurality of SRS transmissions; and forward subsequent communication between the UE and the network entity based on a control voltage pair that includes a downlink (DL) control voltage and a UL control voltage from the set of UL control voltages that corresponds to the RIS UL beam indicated by the network entity, wherein the at least one processor is further configured to:

receive a plurality of DL reference signal (RS) transmissions from the network entity; and forward the plurality of DL RS transmissions to the UE using the DL control voltage, and wherein the at least one UE UL beam is determined based on a set of measurements associated with the plurality of DL RS transmissions.

21. The apparatus of claim 20, wherein the set of measurements associated with the plurality of DL RS transmissions includes a reference signal receiving power (RSRP) or a signal-to-interference-plus-noise ratio (SINR) of the DL RS transmissions.

22. The apparatus of claim 20, wherein the RIS UL beam indicated by the network entity is a beam with a best beam measurement or a most suitable beam measurement from the set of RIS UL beams.

23. The apparatus of claim 20, further comprising at least one of a transceiver or an antenna coupled to the at least one processor.

* * * * *